United States Patent [19]
Yoshinada et al.

[11] Patent Number: 5,949,686
[45] Date of Patent: Sep. 7, 1999

[54] MASTER/SLAVE MANIPULATOR AND CONTROL METHOD THEREFOR

[75] Inventors: Hiroshi Yoshinada, Machida; Kenji Okamura; Kunikazu Yanagi, both of Hiratsuka, all of Japan

[73] Assignee: Komatsu Ltd., Tokyo, Japan

[21] Appl. No.: 08/809,393

[22] PCT Filed: Sep. 19, 1995

[86] PCT No.: PCT/JP95/01864

§ 371 Date: Mar. 20, 1997

§ 102(e) Date: Mar. 20, 1997

[87] PCT Pub. No.: WO96/09144

PCT Pub. Date: Mar. 28, 1996

[30] Foreign Application Priority Data

Sep. 21, 1994 [JP] Japan .................. 6-251543
Oct. 11, 1994 [JP] Japan .................. 6-272856
Oct. 20, 1994 [JP] Japan .................. 6-279706

[51] Int. Cl.$^6$ .................... G06F 17/00; G05B 15/00
[52] U.S. Cl. .................... 364/478.01; 395/95
[58] Field of Search ............... 364/478.01; 318/568.11, 318/568.19; 414/909; 395/95, 97; 901/6

[56] References Cited

U.S. PATENT DOCUMENTS

| | | | |
|---|---|---|---|
| 4,661,032 | 4/1987 | Arai | 414/5 |
| 4,726,248 | 2/1988 | Kawai et al. | 74/471 X |
| 4,831,531 | 5/1989 | Adams et al. | 364/424.01 |
| 5,130,632 | 7/1992 | Ezawa et al. | 318/568.11 |
| 5,382,885 | 1/1995 | Galcudean et al. | 318/568.11 |
| 5,404,290 | 4/1995 | Tsuchihashi et al. | 364/167.01 |
| 5,737,500 | 4/1998 | Seroji et al. | 395/86 |

FOREIGN PATENT DOCUMENTS

| | | |
|---|---|---|
| 61-252081 | 11/1986 | Japan . |
| 62-79978 | 4/1987 | Japan . |
| 2-71979 | 3/1990 | Japan . |
| 2-145272 | 6/1990 | Japan . |
| 4-372380 | 12/1992 | Japan . |

*Primary Examiner*—Paul P. Gordon
*Attorney, Agent, or Firm*—Sidley & Austin

[57] ABSTRACT

The present invention relates to a master/slave manipulator and a method for controlling the same, in which a large working area and good controllability can be provided and a corresponding position shift and an enlargement ratio change can also be attained. To this end, a plurality of representing points are set on and inside a closed surface (A1) of an operating area (A) of one manipulator, while a plurality of target points corresponding to the plurality of representing points are set on and inside a closed surface (B1) of a working area (B) of the other manipulator. Working amounts ($\beta1$, $\beta2$, $\theta1$, $\theta2$) when the leading ends (11, 12) of the one manipulator and the other manipulator respectively reach the plurality of representing points and the plurality of target points, and a corresponding relationship between the working amounts of the two manipulators are obtained; and when the slave (2) is to be operated, the working amounts ($\beta1$, $\beta2$) of the master (1) are converted into working amounts ($\theta1$, $\theta2$) of the slave (2) to thereby operate the slave (2).

11 Claims, 18 Drawing Sheets

FIG. 20A
CONVENTIONAL ART
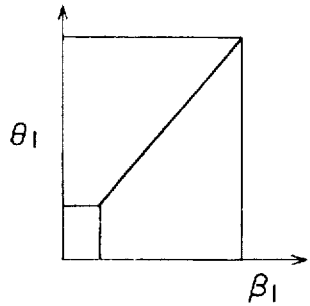
FIG. 20B
CONVENTIONAL ART
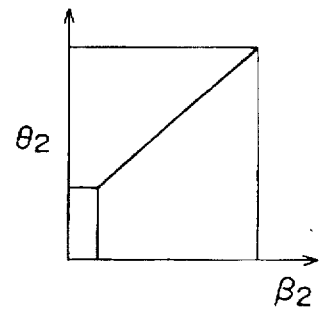
FIG. 21B
CONVENTIONAL ART
FIG. 21A
CONVENTIONAL ART
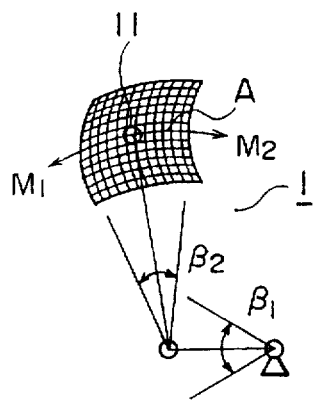
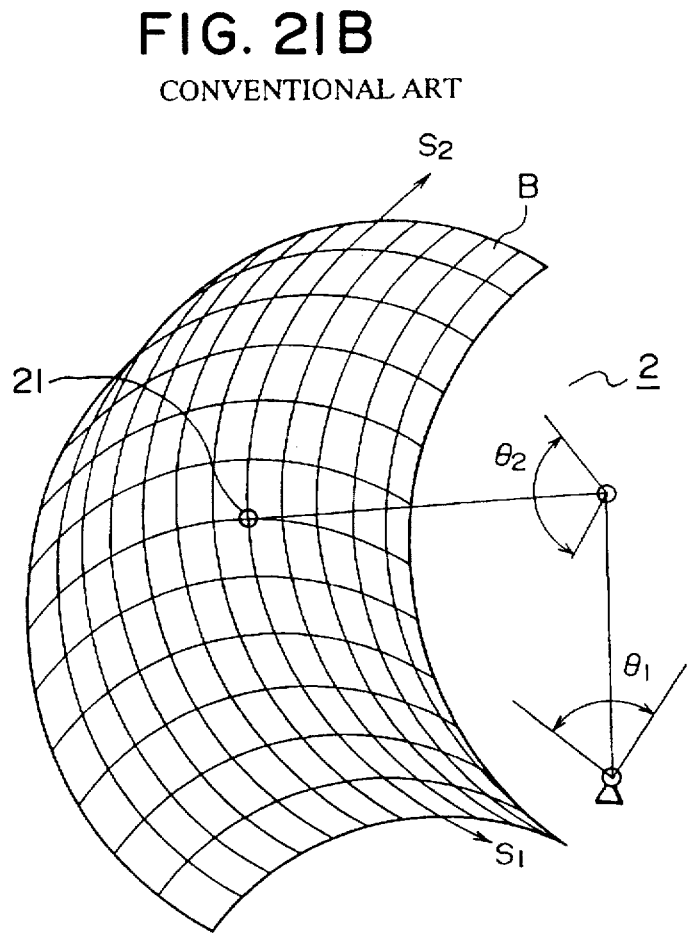

MASTER/SLAVE MANIPULATOR AND CONTROL METHOD THEREFOR

TECHNICAL FIELD

The present invention relates to a master/slave manipulator and a method for controlling the same, and particularly to the master/slave manipulator and the method for controlling the same which are suitable for a command transfer system between a master manipulator and a slave manipulator.

BACKGROUND ART

A master/slave manipulator is recently receiving attention since an operator can carry out a slave operation of a slave manipulator (hereinafter referred to as a slave) by operating a master manipulator (hereinafter referred to as a master). In the master/slave manipulators, there are master/slave manipulators with a non-similar construction in which the forms of a master 1 and a slave 2 are not similar as illustrated in FIGS. 19A and 19B. The master/slave manipulators with a non-similar construction have an advantage of being capable of dealing with various kinds of operations, since the constructions and specifications of the master 1 and slave 2 can be properly selected according to the nature of an operation and the intentions of an operator.

However, in most of the above-described master/slave manipulators with a non-similar construction, an operating area A of a leading end 11 of the master 1 and a working area B of a leading end 21 of the slave 2 are not similar, as FIGS. 19A and 19B illustrate. Therefore, as FIG. 19C illustrates, when an area A', which is the similarly enlarged operating area A, is to be brought into correspondence with the working area B, the boundaries do not match and part of the areas extends off. The master/slave manipulators having the above-described areas A and B have the following disadvantages.

(1) In the areas like the areas A$a$ and A$b$ (diagonally shaded hatching portions), which the leading end 21 of the slave 2 cannot reach, the slave 2 does not follow the master 1 even if the master 1 is operated.

(2) The leading end 21 of the slave 2 following the master 1 cannot reach the areas like the areas B$a$ and B$b$ (vertically shaded hatching portions), which the leading end 11 of the master 1 cannot reach. Specifically, the leading end 21 of the slave 2 can be operated only in the area other than the areas B$a$ and B$b$ in the basic operating area B.

Depending on settings by a design engineer, the following disadvantages may be caused.

(3) Even if an operation prohibited area BB (the working area B+the operation prohibited area BB=a slave movable area) is set for the leading end 21 of the slave 2 for various reasons, in the case that the operating area A of the leading end 11 of the master 1 is overlaid on the area BB, if the master 1 is operated, the slave 2 operates even though the leading end 21 of the slave 2 is in the operation prohibited area BB.

Specifically, common operating area of the master 1 and the slave 2 becomes small, therefore disadvantages of a reduced operating capability, worsened operability, and increasing dangers are caused.

Naturally, by bringing the working amounts $\beta 1$ and $\beta 2$ of each degree of freedom of the master 1 in a one-to-one correspondence with the working amounts $\theta 1$ and $\theta 2$ of each degree of freedom of the slave 2, the entire operating area A is brought into correspondence with the entire working area B, and the above-described common operating area can be at its maximum. However, a concrete corresponding relationship between the degrees of freedom of the master 1 and the slave 2 is at a linear correspondence level, and no corresponding relationship with a special meaning is given (for example, Japanese Patent Application Laid-open No. 2-145272).

Here, disadvantages in a case of linear correspondence is specifically described. For example, in a linear correspondence in FIGS. 19A and 19B, the working amount (for example, a rotary working amount $\theta 1$ of a first axis of the slave 2 is brought in a linear correspondence with the working amount (for example, a rotary working amount) $\beta 1$ of a first axis of the master 1 and the rotary working amount $\theta 2$ of a second axis of the slave 2 is brought in a linear correspondence with the rotary working amount $\beta 2$ of a second axis of the master 1, as illustrated in FIGS. 20A and 20B. However, in a simple correspondence like this, as FIGS. 21A and 21B illustrate, when the leading end 11 of the master 1 is moved along circular arcs M1 and M2, the leading end 21 of the slave 2 moves along circular arcs S1 and S2, so that the leading end 21 of the slave 2 moves in a direction different from the direction in which the leading end 11 of the master 1 operates. Specifically, in the entire area of the working area B of the slave 2, an operator is given a sense of incongruity.

The command transfer system of a master/slave manipulator of another conventional art is described with reference to FIGS. 22 to 26B. The command transfer system in FIG. 22 is constructed by interposing a second comparator 13, a gain multiplier 14, and an actuator 15 between the master 1 for operation and the slave 2 for working, from the master 1 to the slave 2 in the order described, and by providing a feedback circuit between the slave 2 to the second comparator 13 from the slave 2 to the second comparator 13, and control is carried out so that the slave 2 moves following the attitude of the master 1.

To this end, a deviation $\sigma$ is obtained by comparing the attitude information (for example, an angle detected in an angle detecting device 1$a$) $\theta$m of the master 1 to the attitude information (for example, an angle detected in an angle detecting device 2$a$) $\theta$s of the slave 2 in the second comparator 13. A gain G is applied to the deviation $\sigma$ in the gain multiplier 14, and the result is inputted to the actuator 15 of the slave 2 to operate the slave 2 in a direction to make the deviation $\sigma$ to be zero. Specifically, the attitude information $\theta$s is controlled so as to conform to the attitude information $\theta$m. This is expressed in the following equation (1)

$$\theta s \rightarrow \theta m \tag{1}$$

More specifically, in the command transfer system in FIG. 22, as FIGS. 24A and 24B illustrate, the slave 2 is controlled so as to have an attitude and enlargement ratio in a fixed correspondence with the master 1. Therefore, in an actual manipulator operation, it is often convenient if the corresponding relationship between the master 1 and the slave 2 can be controlled according to the requirements of an operator, for example, as follows.

As FIGS. 25A and 25B illustrate, if corresponding positions of the leading ends of the master 1 and slave 2 can be shifted, an operator can operate the master 1 in a position in which the leading end of the master 1 is operated most easily, and contribution to a reduced load in operation and a safe operation can be made.

Further, as FIGS. 26A and 26B illustrate, if an enlargement ratio in a corresponding position area of the leading end of the slave 2 to the leading end of the master 1 is changeable, the enlargement ratio can be changed to a large enlargement ratio when an operation is to be carried out at high speed, and the enlargement ratio can be changed to a small enlargement ratio when an operation is to be carried out with precision, therefore the operations can be conducted in a wider range.

Then, the command transfer system in FIG. 23 is cited as a system for achieving corresponding position shift and enlargement ratio change of the master 1 and the slave 2 in the above-described two examples. This transfer system can further input reference attitude information θmo by interposing a first comparator 7a, an enlargement ratio multiplier 16, and an adder 7b between the master 1 and the second comparator 13, from the master 1 to the second comparator 13 of the command transfer system in FIG. 22 in the order described. In this command transfer system, the attitude information θs is controlled so as to correspond to an altered attitude information θm1 outputted from the adder 7b. This is expressed by the following equation (2).

$$\theta s \rightarrow \theta m1 \qquad (2)$$

The altered attitude information θm1 is shown by the following equation (3), as understood from the first comparator 7a, the enlargement ratio multiplier 16 and the adder 7b in FIG. 23.

$$\theta m1 = (\theta m - \theta mo) \times r + \theta mo \qquad (3)$$

Here, r is an enlargement ratio. Specifically, by giving the reference attitude information θmo of "θm=θs=θmo", the enlargement ratio r can be changed at will.

However, the change of the enlargement ratio r of the master 1 and the slave 2 in the command transfer system in FIG. 23 is not preferable for safety reasons since the altered attitude information θm1 is varied and the slave 2 is moved until the reference attitude information θmo which is "θs= θmo" is set. There are several disadvantages, for example, a disadvantage of having to adjust both of the reference attitude information θmo and the enlargement ratio r in order to respectively set the master 1 and the slave 2 in an arbitrary attitude (in other words, in order to shift a corresponding position).

FIG. 27 is a diagram of a bilateral type of master/slave manipulator command transfer system, and the master 1 is provided with an attitude and force detector 1c and an actuator 1b, while the slave 2 is provided with an attitude and force detector 2c and an actuator 2b. Between the master 1 and the slave 2, a control means 30A, which is equipped with a master following command value operation section 31 and a reaction force calculating operation section 32 and which consists of, for example, a microcomputer, is provided. The master following command value operation section 31 inputs an attitude θm3 and an operation force Fmo from the attitude and force detector 1c while inputting an attitude θs3 of the slave 2 from the attitude and force detector 2c, then computing a command y from the attitude θm3, operation force Fmo and the attitude θs3, and outputs this command y to the actuator 2b. The actuator 2b operates the slave 2 correspondingly to this command y. Thereby when the operator operates the master 1, the slave 2 operates following the master 1.

On the other hand, the reaction force calculating operation section 32 inputs a load Fx of the slave 2 from the attitude and force detector 2c, and a reaction force command value ym, to which a specified multiplied factor is applied, is outputted to the actuator 1b. Here, the load Fx is an added value of the tare of the slave 2 with an attachment and the force which the slave 2 gives to the outside. The actuator 1b gives a reaction force corresponding to the reaction force command value ym. For example, in a master/slave manipulator which generates a large load Fx, a reaction force of one several tenth to one several hundredth of the load Fx is returned to the master 1, so that an operator can carry out operations while feeling the condition of the load of the slave 2 by this reaction force. A unilateral type of master/slave manipulator has the above-described construction from which the actuator 1b and the reaction force calculating operation section 32 are omitted, so that an operator cannot feel the condition of the load.

However, by the above-described conventional manipulator, operations can be carried out with an working force larger than human power, but the following disadvantages exist. FIG. 28 is a view of a wheeled rotary type of master/slave manipulator, and a grinder 18 is attached at the leading end of the slave 2 as an attachment. Since the manipulator is made so as to exert the effect of a large working force, a large load can be easily encountered, but the load which is transferred to the operator is so small that the operator cannot feel the load. Accordingly, when a surface of a workpiece 19 is to be precisely cut, an operator can obtain only a small reaction force with a bilateral type; and a reaction force cannot be obtained with a unilateral type, therefore there is a disadvantage of being unable to conduct a precise operation such as a precise cutting with a working force being precisely adjusted.

The above-described operation can be seen not only in a grinder operation but also in an operation of holding a fragile object. More specifically, the conventional manipulators have a disadvantage of being unable to be preferably used for operations requiring precise adjustment of a working force such as a tensile force, pressing force, holding force, or the like.

SUMMARY OF THE INVENTION

The present invention is made in order to eliminate the above-described disadvantages of the conventional art, and its object is to provide a master/slave manipulator and a method for controlling the same in which a common operating area is maximized by bringing the entire operation area and working area of a master and a slave in a one-to-one correspondence while a sense of incongruity is not felt by an operator in operation even in this condition. Its further object is to provide a master/slave manipulator which can carry out corresponding position shift and enlargement ratio change of the master/slave manipulator safely with the slave remaining at rest when corresponding position shift and enlargement ratio change of the master/slave manipulator are to be carried out. Furthermore, another object is to provide a master/slave manipulator preferably used in, for example, a grinder operation, an operation of holding a fragile object, or the like, by setting the upper limit value of a working force, such as a tensile force, a pressing force, holding force, or the like.

The first aspect of the method for controlling the master slave manipulator relating to the present invention is a method for controlling the master/slave manipulator in which an operating area and a working area of leading ends of a master and a slave are not similar, characterized by including the steps of:

(1) setting a plurality of representing points on a closed surface which is a limit surface of an operating area of one manipulator;

(2) setting a plurality of target points, so as to respectively correspond to the plurality of representing points in step (1), on a closed surface which is a limit surface of a working area of the other manipulator;

(3) setting a plurality of representing points inside the operating area of the one manipulator;

(4) setting a plurality of target points, to respectively correspond to the plurality of representing points in step (3), inside the working area of the other manipulator;

(5) obtaining working amounts of the respective degrees of freedom of the one manipulator when the leading end of the one manipulator reaches the respective plurality of representing points in steps (1) and (3), while obtaining working amounts of the respective degrees of freedom of the other manipulator when the leading end of the other manipulator reaches the respective plurality of target points in steps (2) and (4); and (6) obtaining a corresponding relationship between a pair of working amounts of the one manipulator and a pair of working amounts of the other manipulator in step (5), and further including the step of, when the slave is to be operated by operating the master, converting the working amounts of the master at the time of operation of the master into the working amounts of the slave based on the above-described corresponding relationship to thereby operate the slave based on the working amounts of the slave.

Moreover, the distributions of the above-described plurality of target points can be set inhomogeneously.

Further, a number of pairs, of the above-described plurality of target points set to be inhomogeneously distributed, are set and a corresponding relationship of each of a number of the above-described pairs is obtained to previously select a corresponding relationship to be used from the relationships of a number of the pairs when the slave is to be operated by operating the above-described master.

According to the above-described first aspect of the invention, the plurality of representing points and the plurality of target points on the limit surfaces of both of the operating and working areas (for example, A and B in FIG. 1 relating to the present invention) are made to correspond to each other by the steps (1) and (2). Thereby, the entire range of the working area B becomes a working area in a one-to-one correspondence with the entire range of the operating area A, so that a useless area does not exist. Then the plurality of representing points and the plurality of target points in the operating and working areas are brought into correspondence with each other by the steps (3) and (4); therefore, a corresponding relationship can be set so that the operating direction of the slave follows and corresponds to the operating direction of the master.

Incidentally, according to the first aspect of the invention, an area and an operating direction given a meaning, for example, that an operation is desired to be carried out, for example, at an extremely low speed with high accuracy, that a speed of the movement of the leading end of the slave corresponding to the speed of the movement of the leading end of the master is desired to be changed according to the position of the leading end, or the like, can be set inside the working area B (specifically, a common working area, hereinafter referred to as the same).

Specifically, for example, by setting the distribution of target points homogeneously, the above-described characteristic that "the operating direction of the slave follows and corresponds to the operating direction of the master" can be homogeneously obtained in most of the range of the working area B. Contrary to the above, when the distribution of the target points in one area and operating direction is deliberately set inhomogeneously, as compared to the distribution of the target points in the other areas and operating directions, the above-described one area and operating direction can be an area and operating direction given the above-described various kinds of meanings.

A construction in which only the methods for securing the areas given the above-described meanings are selected, is an inhomogenous setting of the distribution of a plurality of target points. By including a number of corresponding relationships based on the above-described inhomogeneous setting, selections according to requirements are achieved.

Incidentally, the identification of the steps as (1) to (6) are numbers to make the description easier to understand, and are not restrictive as a time series order. Accordingly, the procedural steps can be in the order of the above-described numbers, or the procedural steps can be in the order of (3), (4), (1), (2), (5), (6); in the order of (1), (3), (2), (4), (5), (6); in the order of (1), (3), (4), (2), (5), (6); in the order of (3), (1), (2), (4), (5), (6); or in the order of (3), (1), (4), (2), (5), (6). The order of the flowchart in FIG. 6 is also suitable.

Specifically, as the steps in FIG. 6, a plurality of representing points are respectively set on the limit surface of and on the inside of the operating area of one manipulator (Step 61), and a working amount of each degree of freedom of the one manipulator is obtained when the leading end of the one manipulator reaches each of the plurality of representing points (Step 62). Next, a plurality of target points to respectively correspond to the above-described representing points are set on the limit surface of and on the inside of the working area of the other manipulator (Step 63), and a working amount of each degree of freedom of the other manipulator is obtained when the leading end of the other manipulator reaches each of the plurality of target points (Step 64). Then, a corresponding relationship between a pair of working amounts of the respective degrees of freedom of the one manipulator and a pair of working amounts of the respective degrees of freedom of the other manipulator is obtained (Step 65). When the master manipulator is operated (Step 66), a working amount of each degree of freedom of the master manipulator is initially detected (Step 67), then each detected value is converted into a working amount of each degree of freedom of the slave manipulator based on the above-described corresponding relationship (Step 68), and each degree of freedom of the slave manipulator is operated based on each converted value (Step 69). In the case that a plurality of corresponding relationships are set (Step 71), at the occasion of use, a corresponding relationship is previously selected (Step 72), and thereafter the steps 66 to 69 can be conducted in the order described.

Incidentally, "surface" in "on the limit surface" and "on the closed surface" shall be converted into "line" if the master/slave manipulator is operated two-dimensionally. Specifically, "a limit surface" includes not only the external perimeter surface of the operating area and the working area of a master/slave manipulator operated three-dimensionally, but also the external perimeter line of the operating area and the working area of a master/slave manipulator operated two-dimensionally.

The second aspect of the method for controlling a master slave manipulator is a method for controlling a master/slave manipulator in which a corresponding position shift and an enlargement ratio change of a master and a slave are freely achieved, and in which a slave operation of the slave following the master is attained by comparing operation signals from the master and the slave in a second comparator, and is characterized by including the steps of: at the time of a corresponding position shift or an enlargement ratio change, moving a leading end of the slave to a target position by operating the master, then cutting off the operation signal to the second comparator from the master while inputting an operation signal of the slave at the time of the cutoff of the operation signal from the master to the second comparator instead of an operation signal from the master, and during the time of the above-described inputting of the operation signal of the slave, moving the leading end of the master to a desired position and changing the enlargement ratio.

The operation of the above-described construction is explained with reference to FIG. 8 as an example. Specifically, at the time of corresponding position shift and enlargement ratio change:

Step 101: The leading end of the slave is moved to a target position by operating the master. Thereby, the position of the slave is determined.

Step 102: Thereafter, an operation signal to the second comparator from the master is cut off, and an operation signal of the slave at the time of the cutoff is inputted to the second comparator instead of the operation signal from the master. Thereby, the slave is operated having the operation signal of the slave at the time of the cutoff as a target value. However, the operation signal of the slave at the time of the cutoff becomes a fixed value, so that the slave maintains the attitude of the slave at the time of the cutoff. That is, the slave remains at rest.

Step 103: During inputting (while the slave is at rest), the leading end of the master is moved to the position corresponding to a target position of the slave (accordingly relative shift occurs at the positions of the leading ends of the master and slave), and the enlargement ratio is changed.

When conducting either one of the corresponding position shift and the enlargement ratio change, it is needless to say that the procedural steps are as follows, and the second aspect of the control method includes an individual one of these cases.

When a corresponding position shift alone is conducted, the leading end of the slave is moved to a target position by operating the master, thereafter an operation signal to the second comparator from the master is cut off while an operation signal of the slave during the cutoff is inputted to the second comparator instead of the operation signal from the master, and the leading end of the master is moved to the desired position during the inputting (while the slave remains at rest).

On the other hand, when an enlargement ratio change alone is conducted, operation of the master is halted, thereafter an operation signal to the second comparator from the master is cut off while an operation signal of the slave at the time of the cutoff is inputted to the second comparator instead of the operation signal from the master, and the enlargement ratio is changed without operating the master during the inputting (while the slave remains at rest).

Then the first aspect of the master/slave manipulator relating to the present invention is a master/slave manipulator in which an operating area of a leading end of a master based on a working amount β of the master and a working area of a leading end of a slave based on a working amount θ of the slave are not similar; and is characterized by including a control means, a master working amount detecting means for detecting the working amount β and for inputting the working amount β to the control means, and a slave operating means for inputting the working amount θ of the slave from the control means and for operating the slave based on the working amount θ; and characterized by the above-described control means previously matching a plurality of representing points set on a closed surface, which is a limit surface of an operating area of one manipulator, to a plurality of target points set on a closed surface, which is a limit surface of a working area of the other manipulator, so as to respectively correspond to the plurality of representing points on the closed surface while matching a plurality of representing points previously set inside the operating area of the one manipulator to a plurality of target points previously set inside the working area of the other manipulator so as to correspond to each of the plurality of representing points inside the operating area, memorizing the corresponding relationship between the working amount of each degree of freedom of the one manipulator and the working amount of each degree of freedom of the other manipulator, and converting the working amount β obtained from the master working amount detecting means into the working amount θ based on the above-described corresponding relationship to input the working amount θ to the slave operating means when the master 1 is operated.

The corresponding relationship, which the above-described control means previously memorizes, can be a corresponding relationship based on a plurality of target points with an inhomogeneous setting of distribution.

Furthermore, the above-described control means can be a control means which memorizes a number of corresponding relationships with different degrees of inhomogeneous setting of distribution, and which can select a desired corresponding relationship from a number of the corresponding relationships based on a command from an additionally equipped selection command sending means.

The above-described first aspect of the master/slave manipulator is an embodied example of an apparatus of the first aspect of the invention of the above-described controlling method. Accordingly, the same operation as in the above-described controlling method can be obtained.

The second aspect of the invention of the master/slave manipulator is a master/slave manipulator in which a slave operation, of a slave following a master, is achieved by comparing working signals from the master and the slave in a second comparator; and is characterized by interposing a first comparator, an enlargement ratio multiplier, and an adder between the master and the second comparator, from the master to the second comparator in the order described; characterized by connecting a first open/close switch and a first sample-and-hold device in series in the order described in a circuit branching from the master to connect to the first comparator; and characterized by connecting a second open/close switch and a second sample-and-hold device in series in the order described in a circuit branching from the slave to connect to the adder.

A third open/close switch can be interposed in a circuit branching from the second sample-and-hold device to connect to a portion between the first open/close switch and the first sample-and-hold device.

The above-described construction is an embodied example of the second aspect of the invention of the controlling method, and the operation in conformance with the invention of the method can be obtained. Main points are as follows.

"An operating signal to the second comparator from the master is cut off" in the second aspect of the invention of the method is carried out with the first open/close switch (hereinafter, referred to as a first switch) and the first comparator. Specifically, when the first switch is closed, two operation signals with the same value from the master are compared in the first comparator, therefore the deviation becomes zero. Accordingly, the master can be freely operated without operating the slave. The enlargement ratio is multiplied by the above-described deviation of zero in the enlargement ratio multiplier; therefore, the output to the adder from the enlargement ratio multiplier is zero. Accordingly, the enlargement ratio can be changed at will.

"An operation signal of the slave at the time of the cutoff is inputted instead of the operation signal from the master" in the second aspect of the invention of the method is carried out with the second sample-and-hold device (hereinafter referred to as a second hold device), the second open/close switch (hereinafter, referred to as a second switch), and the adder.

Specifically, the first switch is closed and at the same time or thereafter, the second switch is closed. Thereby the movement of the slave is prevented. Immediately thereafter, the second switch is opened (the second switch can be closed only instantly after the above-described first switch is closed). Thereby the operation signal of the slave at the time of the cutoff of the operation signal from the master can be memorized in the second hold device. The memorized operation signal is outputted to the adder, but as described above, the output to the adder from the enlargement ratio multiplier is zero, so that the memorized operation signal is only inputted in the second comparator as an operation target value of the slave. The second comparator compares the operation target value to the present operation signal of the slave, and tries to operate the slave so that the deviation becomes zero. However, the operation target value is a set value memorized in the second hold device; therefore, the slave continues to maintain an attitude based on the above-described operation target value.

Specifically, the slave continues to be at rest regardless of the operation of the master. Accordingly, coupled with the above-described "the master is freely operated without operating the slave", a corresponding position can be moved safely at will with the slave remaining at rest.

After completing the corresponding position shift and the enlargement ratio change, the slave can be operated following the master, based on the renewed corresponding position shift and the changed enlargement ratio, by opening the first switch (specifically, both switches are opened).

In addition, by including the third open/close switch (hereinafter, referred to as a third switch), functions are added. More specifically, when it is desired to return to a condition with a fixed corresponding attitude and enlargement ratio in FIG. 22 of the conventional art, the first switch is initially closed, and at the same time or thereafter, the second switch is closed. Thereafter the second switch is immediately opened, and then the enlargement ratio r is made to be "r=1". Thereafter, the first switch is opened (specifically, a condition in which all the switches are open), and thereafter by instantly closing the third switch, the condition can return to the condition in FIG. 13 in the conventional art.

The third aspect of the invention of the master/slave manipulator is a master/slave manipulator in which a slave conducts a slave operation when a master is operated, and is characterized by including a control means which compares a working force Fm of the slave estimated from the operation of the master to an upper limit value Fo, previously set, of the working force of the slave, and which operates the slave with the working force Fm when Fm<Fo, and on the other hand, operates the slave with the working force Fo when Fm≧Fo.

The control means can further return a force corresponding to the working force Fm to the master when Fm<Fo, and on the other hand, can return a specified force Fc to the master when Fm≧Fo. The control means can further give a warning by a warning means when Fm≧Fo.

The operation of the above-described construction will be explained with reference to FIG. 14, which illustrates an embodiment of the present invention. To the control means, the upper limit value Fo of the working force of the slave according to the intentions of operations are previously inputted (Step 151). Then the control means calculates or inputs the working force Fm of the slave estimated from the operation of the master (Step 152), and compares the working force Fm to the upper limit value Fo (Step 153). When the compared result is Fm<Fo, the slave 2 is operated with the working force Fm (Step 154). In this case, the slave conducts a slave operation following the master. On the other hand, when Fm≧Fo, the slave is operated with the working force Fo (Step 155). In this case, the operation force Fm from the master is canceled, and the slave is operated with a working force having the upper limit value Fo being maintained.

As a bilateral type, by comparing both working forces Fm and Fo to control, an operator can work while feeling both working forces Fm and Fo of the slave from the master. Further, by including a warning means, for example, a warning lamp, a warning device or the like, an operator can sense a condition in which Fm≧Fo, even with a unilateral type; therefore, the same operations as conducted with a bilateral type can be carried out. According to requirements, the warning means can be used in a bilateral type.

BRIEF DESCRIPTION OF THE DRAWINGS

FIG. 3A is a diagram depicting an operation locus of the master while FIG. 3B is a diagram depicting an operation locus of the slave;

FIG. 16A is a diagram of an operation in a downward direction with a working force Fs smaller than a working force f(W), while FIG. 16B is a diagram of an operation in a downward direction with the working force Fs greater than the working force f(W), and FIG. 16C is a diagram of an operation in an upward direction;

FIG. 19A is a diagram depicting a master and its operating area, while FIG. 19B is a diagram depicting a slave and its working area, and FIG. 19C is a diagram depicting a case in which a similarly enlarged operating area of the master and the working area of the slave are brought into direct correspondence;

FIGS. 20A and 20B are graph charts explaining a linear correspondence of working amounts in the master/slave manipulator in FIG. 19A and 19B, and FIG. 20A is a graph chart of a linear correspondence of working amounts $\beta 1$ and $\theta 1$ of first arms of the master and the slave, while FIG. 20B is a graph chart of a linear correspondence of working amounts $\beta 2$ and $\theta 2$ of second arms of the master and the slave;

FIGS. 21A and 21B depict operation loci in the linear correspondence of the working amounts relating to the conventional art, and FIG. 21A is a diagram depicting the operation locus of the master, while FIG. 21B is a diagram depicting the operation locus of the slave;

FIG. 24A is an explanatory diagram of the master, while FIG. 24B is an explanatory view of the slave;

FIG. 25A is an explanatory diagram of the master, while FIG. 25B is an explanatory diagram of slave;

FIG. 26A is an explanatory diagram of the master, while FIG. 26B is an explanatory diagram of the slave;

BEST MODE FOR CARRYING OUT THE INVENTION

A preferred embodiment of a master/slave manipulator and a method for controlling the same relating to the present invention will be particularly described below with reference to the attached drawings.

Figure 7:
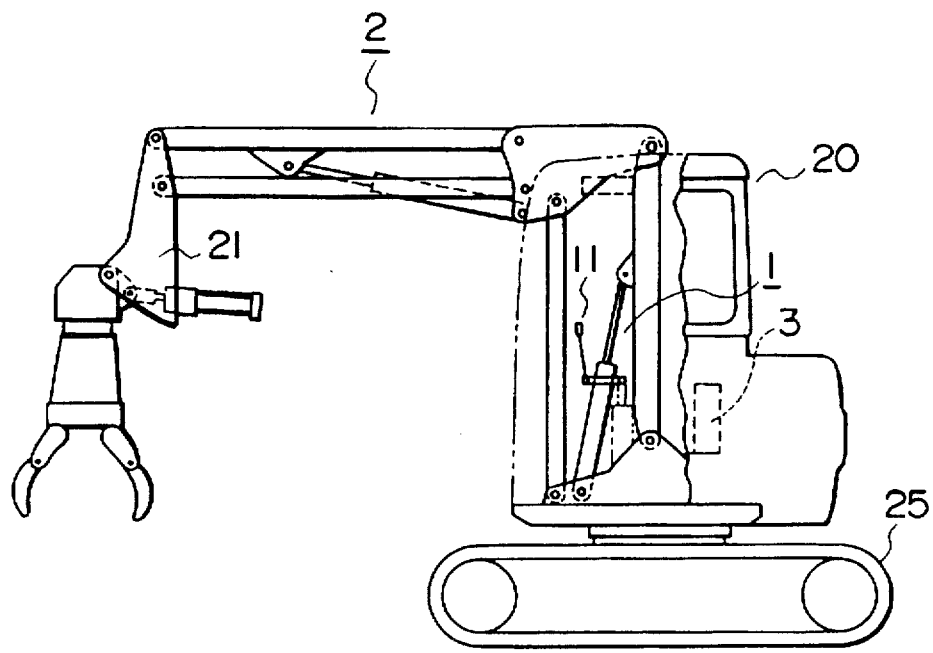
FIG. 7 is a side view of a wheeled type of manipulator to which the first embodiment is applied.
Figure 8:
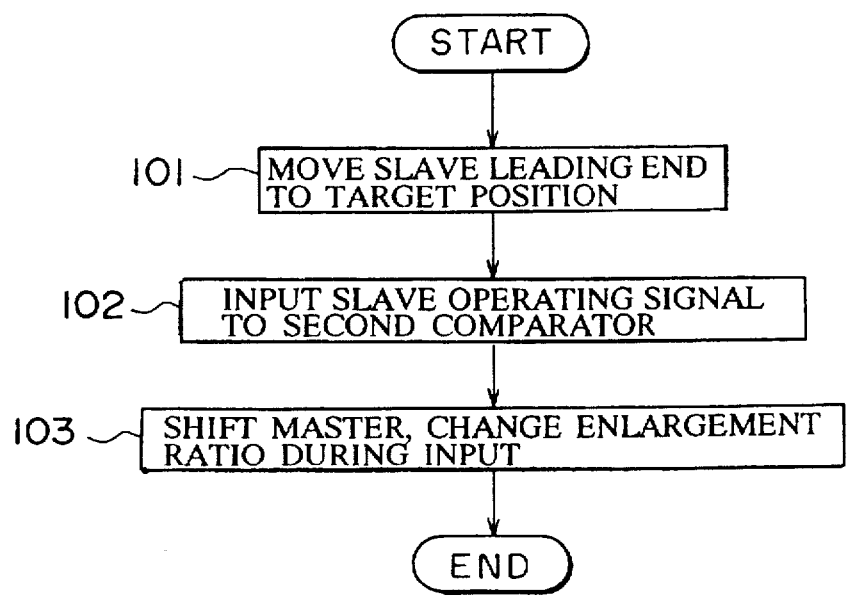
FIG. 8 is a flowchart of the corresponding position shift and the enlargement ratio change relating to a second embodiment of the present invention.

The first embodiment is an example applied to a wheeled type of manipulator illustrated in FIG. 7, and the availability is confirmed. The wheeled type of manipulator is provided with an upper rotary body 20 rotatably on a lower traveling body 25, and is provided with a master 1 and a slave 2 on the upper rotary body 20. The master 1 and the slave 2 are respectively made by linking two quadric joint links. The master 1 and the slave 2 are configured so that a leading end 21 of the slave 2 conducts a slave operation in back-to-front and up-and-down directions through a bilateral control or a unilateral control in a control means 3 consisting of, for example, a microcomputer or the like, when an operator operates a leading end 11 of the master 1 in back-and-forth and up-and-down directions.

Figure 1:
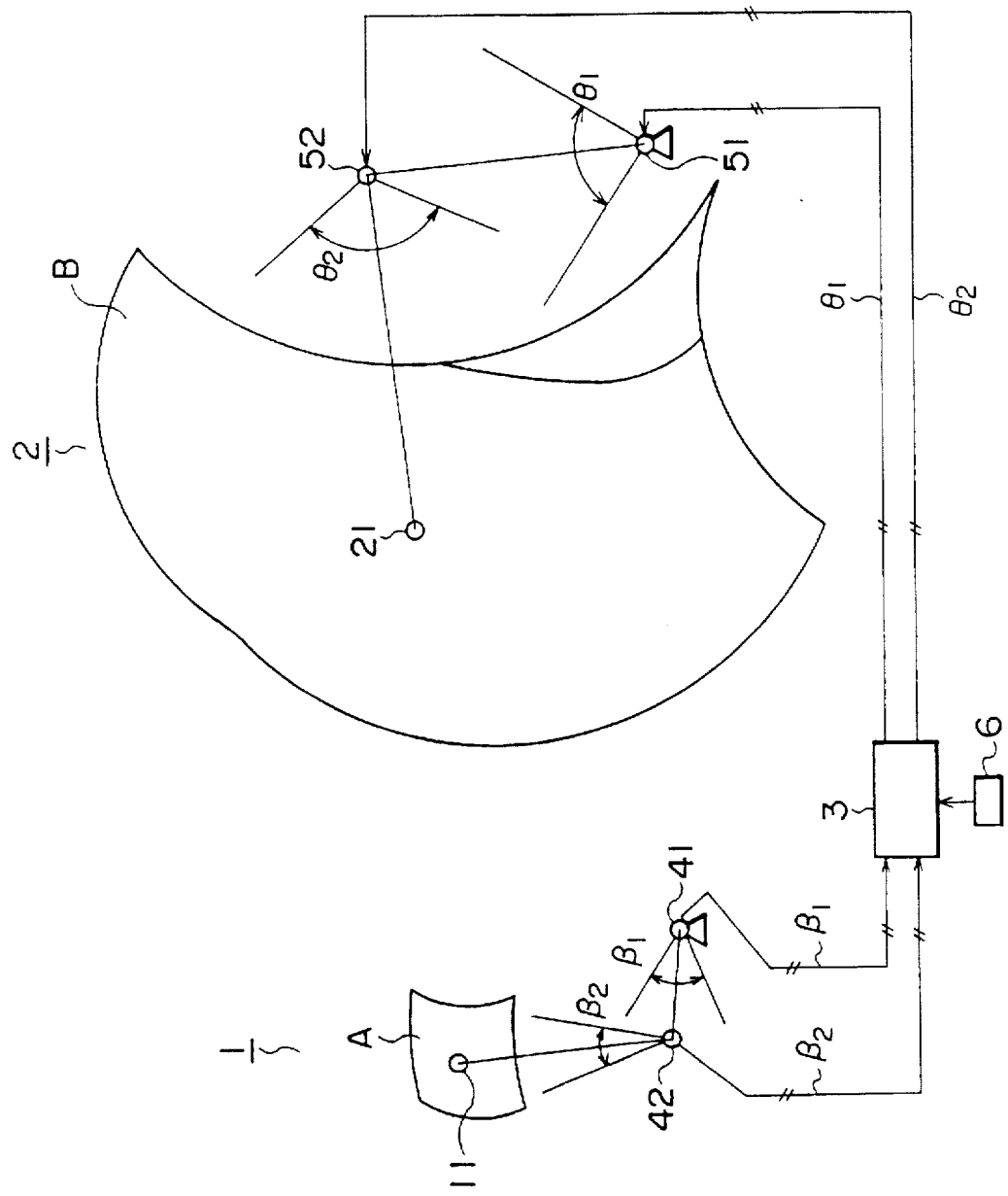
FIG. 1 is a schematic diagram of a master/slave apparatus relating to a first embodiment of the present invention.

FIG. 1 depicts a schematic form of a link mechanism of the master 1 and the slave 2, and is a diagram in which a master working amount detecting means 4 (41, 42) of the master 1, a slave operating means 5 (51, 52), and a selection command sending means 6 are connected to the control means 3. In the embodiment, the master working amount detecting means 41 is a rotary encoder provided at a first articulation of the master 1, and the master working amount detecting means 42 is a rotary encoder provided at a second articulation of the master 1. The slave operating means S1 is a rotary motor provided at a first articulation of the slave 2, and the slave operating means 52 is a rotary motor provided at a second articulation of the slave 2.

The actual specifications of the master 1 and the slave 2 will be described in the following. The length of a first arm of the master 1 is 213 mm and the range of its working amount $\beta 1$ is from −30 degrees to +30 degrees when a horizontal leftward direction is 0 degree. The length of a second arm of the master 1 is 443 mm, and the range of its working amount $\beta 2$ is from −5 degrees to +25 degrees when a vertical upward direction is 0 degree. On the other hand, the length of a first arm of the slave 2 is 1165 mm, and the range of its working amount $\theta 1$ is from −26 degrees to +61 degrees when a vertical upward direction is 0 degree. The length of a second arm of the slave 2 is 1475 mm, and the range of its working amount $\theta 2$ is from −44.5 degrees to +71 degrees when a horizontal leftward direction is 0 degree.

Thus, in the above-described wheeled type of manipulator, the specifications of the master 1 and the master 2 are different, and an operating area A of the leading end 11 of the master 1 and a working area B of the leading end 21 of the slave 2 are not similar. Therefore, in order to bring the overall operating area A and the working area B into a one-to-one correspondence, and in order to eliminate a sense of incongruity felt by an operator during operation in the operation of the slave 2 following the operation of the master 1 within the operating area A and the working area B, the corresponding relationship between the working amount $\beta$ of the master 1 and the working amount $\theta$ of the slave 2 is obtained by the following steps.

Figure 2A:
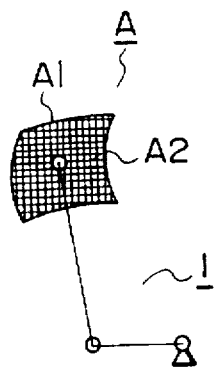
FIG. 2A is a diagram depicting an orthogonal lattice of a master in an operating area A relating to the first embodiment.
Figure 2B:
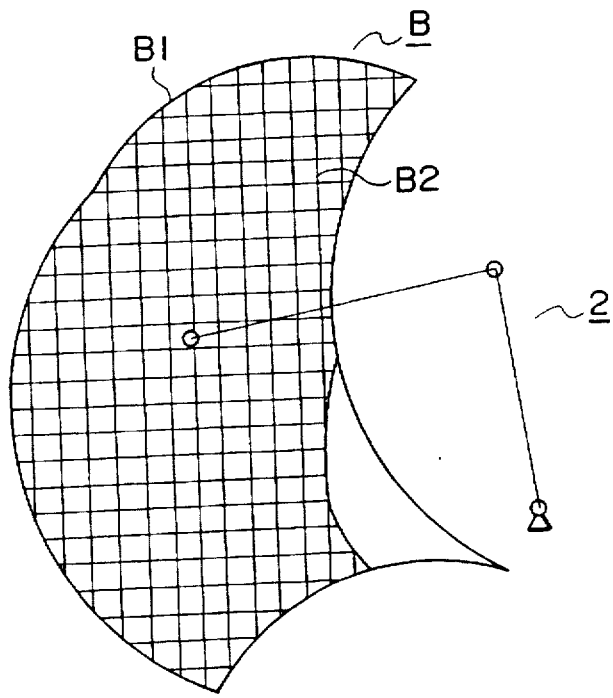
FIG. 2B is a diagram depicting an orthogonal lattice of a slave in a working area B relating to the first embodiment.

The following is a description with reference to FIGS. 2A and 2B.

(i) On a closed line A1, which is a limit line of the operating area A, nodal points generated by two degrees of freedom of the master 1 and an equally divided point of each side are set as a plurality of representing points of the master 1.

(ii) Then, on a closed line B1, which is a limit line of the working area B, a target point which is to correspond to every representing point set in the above-described (i) is set almost homogeneously, and these target points are set as a plurality of target points of the slave 2.

(iii) An orthogonal lattice A2 is set inside the operating area A, and several intersection points are set as a plurality of representing points of the master 1.

(iv) An orthogonal lattice B2 is set inside the working area B, then target intersection points, which are to correspond to each respective representing point set in the above-described (iii), are set almost homogeneously, and these target points are set as a plurality of target points of the slave 2.

(v) Each working amount β1 and β2 of the master 1 in the case that the leading end of the master 1 reaches each of the plurality of representing points set in the above-described (i) and (iii) are obtained. Similarly, each working amount θ1 and θ2 in the case that the leading end of the slave 2 reaches each of the plurality of target points set in the above-described (ii) and (iv) are obtained.

(vi) The corresponding relationship between a pair of the working amounts β1 and β2 of the master 1 and a pair of the working amounts θ1 and θ2 of the slave 2 is obtained.

It is necessary to substitute the working amounts of β1 and β2 of the master 1 in the case that the leading end of the master 1 reaches an arbitrary point on the orthogonal lattice A2 in the obtained corresponding relationship to confirm a locus B3, (refer to FIG. 3B) of the leading end 21 of the slave 2 corresponding to each of the resulting values θ1 and θ2, is not curved unnaturally as compared to the orthogonal lattice B2. At this time, if the locus B3 of the slave 2 is curved unnaturally, it is recommendable to change the positions, numbers, set distributions, and so on of each representing point and each target point to obtain a new corresponding relationship by repeating the above-described steps (i) to (vi).

Specific examples of the above-described corresponding relationship in the above-described specifications of the wheeled type of manipulator will be described. Specifically, when the corresponding relationship from each of the working amounts β1 and β2 to the working amounts θ1 and θ2 is obtained by using quaternary polynomials after setting twenty-two of the plurality of representing points in (i) and twenty-two target points in (ii), and setting twenty-three of plurality of representing points in (iii) and twenty-three target points in (iv), the following equations (4) and (5) are obtained. The equation (4) is a polynomial consisting of fifteen terms which allows the conversion into the working amount θ1 corresponding to each of the working amounts β1 and β2 in the entire range of the working amounts β1 and β2 and of the working amount θ1. The equation (5) is a polynomial consisting of fifteen terms which allows the conversion into the working amount θ2 corresponding to each of the working amounts β1 and β2 in the entire range of the working amounts β1 and β2 and of the working amount θ2.

$$\theta_1 = 8.64986 - 3.64088e^{-1} * \mu - \qquad (4)$$
$$1.13090e^{-1} * v + 2.10202e^{-4} * \mu^2 -$$
$$5.22250e^{-4} * \mu * v + 2.66369e^{-3} * v^2 -$$
$$2.79985e^{-6} * \mu^3 + 9.19868e^{-6} * \mu^2 * v -$$
$$7.62714e^{-7} * \mu * v^2 + 2.91429e^{-6} * v^3 +$$
$$5.13139e^{-8} * \mu^4 - 5.37751e^{-8} * \mu^3 * v -$$
$$2.35860e^{-9} * \mu^2 * v^2 - 6.63425e^{-8} * \mu * v^3 -$$
$$2.66226e^{-8} * v^4$$

$$\theta_2 = 12.794 + 4.78685e^{-2} * \mu - \qquad (5)$$
$$4.34973e^{-1} * v - 9.83643e^{-4} * \mu^2 -$$
$$2.42900e^{-4} * \mu * v - 1.40395e^{-3} * v^2 +$$
$$2.04686e^{-6} * \mu^3 - 4.71139e^{-6} * \mu^2 * v +$$
$$1.33173e^{-5} * \mu * v^2 - 6.97838e^{-6} * v^3 -$$
$$2.54834e^{-10} * \mu^4 + 2.80176e^{-8} * \mu^3 * v -$$
$$2.99490e^{-8} * \mu^2 * v^2 + 1.95422e^{-10} * \mu * v^3 +$$
$$9.64018e^{-8} * v^4$$

$$\mu = -213 * \cos(\beta_1) - 443 * \sin(\beta_2) + 289.93 \qquad (6)$$
$$v + -213 * \sin(\beta_1) + 443 * \cos(\beta_2) - 436.27 \qquad (7)$$

The "e" in the equations (4) and (5) shows "10". The "μ" and "v" in the equations (4) and (5) are coordinate values corresponding to the lateral position and the vertical position (unit mm) of the leading end 11 of the master 1 when the position of the master detecting means 42 is a standard.

That is to say, when explaining with reference to FIG. 1, the control means 3 previously memorizes the above-described corresponding relationship [equations (4) to (7)]. Then, when an operator operates the master 1, the control means 3 inputs the working amounts β1 and β2 from the master working amount detecting means 41 and 42, calculates the working amounts θ1 and θ2 in real time from the equations (4) to (7), and outputs the working amounts θ1 and θ2 to the slave operating means 51 and 52. The slave operating means 51 and 52 operate the slave 2 based on the working amounts θ1 and θ2.

Figure 3A:
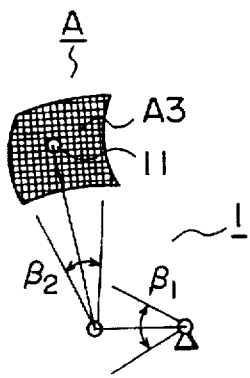
FIGS. 3A and 3B are diagrams depicting the effect of the first embodiment.
Figure 3B:
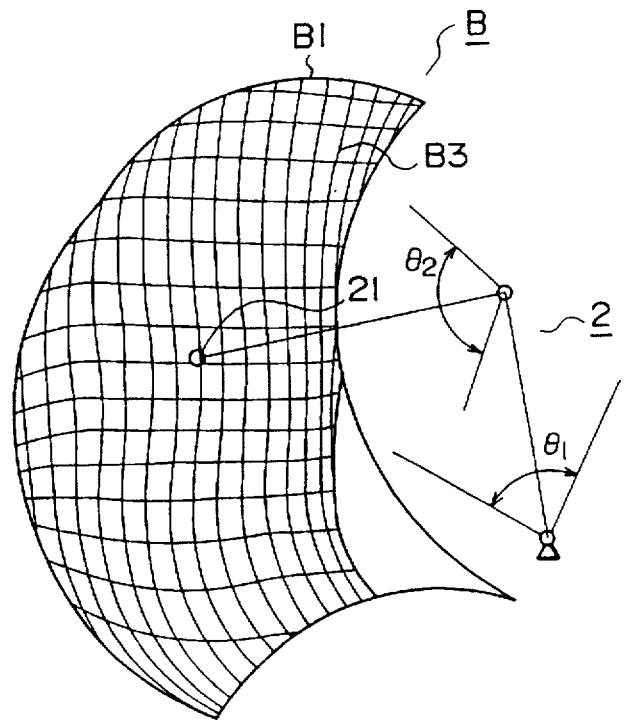

In FIGS. 3A and 3B, showing the effect of the embodiment, FIG. 3A shows an operation locus A3 of the leading end 11 of the master 1 operated in a vertical and lateral directions illustrated in the drawing, and FIG. 3B shows an operation locus B3 of the leading end 21 of the slave 2 operated following the operation locus A3 of the above-described master 1.

As seen from FIG. 3B, the operation locus B3 is almost uniform in the entire range of the working area B. It can be understood that in most of the area, except for the vicinity of the closed line B1 of the working area B, the positions and the directions of motion of the leading end 11 of the master 1 almost correspond to those of the leading end 21 of the slave 2. In other words, in most of the area of the working area B, when the leading end 11 of the master 1 is linearly operated in vertical and lateral directions as illustrated in the drawing, the leading end 21 of the slave 2 operates almost linearly in the vertical and lateral directions as illustrated in the drawing. Naturally, when the leading end 11 is linearly operated in a slanting direction, the leading end 21 operates almost linearly in the same direction (slanting direction). In a word, an operator does not feel incongruity in operation in most of the area of the working area B of the slave 2. Incidentally, in the vicinity of the closed line B1 of the working area B, the direction of motion and position of the master 1 do not correspond to those of the slave 2, unlike in the above-described most of the area. That is to say, when the leading end 11 of the master 1 is linearly operated in the vicinity of the closed line A1 of the operating area A, the leading end 21 of the slave 2 operates nearly in a circular arc along the closed line B1 of the working area B.

In the above, the first embodiment is described in detail, and the examples based on the first embodiment will be explained below.

The first example: Though the corresponding relationship in the first embodiment is obtained about a manipulator with the working amount of two degrees of freedom, a manipulator including a direct-acting axis or having three degrees of freedom or more is applicable. Or a manipulator of three-dimensional operation is applicable. In the case of a master/slave manipulator of three-dimensional operation, a plurality of representing points are previously set, for example, initially on the axis of the third dimension. Next, two-dimensional operation surface of every representing point is obtained. Then in each operation surface, each corresponding relationship is obtained based on the above-described (i) to (vi). By making each of these corresponding relationships successively change according to the axis of the third dimension, corresponding relationships in the three-dimensional operation are generally obtained.

The second example: The control means 3 can directly memorize the working amounts 1 and 2 and the corresponding working amounts θ1 and θ2, instead of memorizing the corresponding relationships in the (4) to (7) method. In this case, it goes without saying that the values of the working amounts θ1 and θ2 are the values previously obtained by substituting the working amounts β1 and β2 in the above-described equations. Specifically, in FIG. 1, when an operator operates the master 1, the master working amount detecting means 4 detects the working amounts β1 and β2. The control means 3 inputs this working amounts β1 and β2, extracts the working amounts θ1 and θ2 corresponding to the working amounts β1 and β2, and outputs this working amounts e1 and θ2 to the slave operating means 5 (51, 52). In this way, the time required for computing can be shortened.

The third example: A plurality of representing points and a plurality of target points in the above-described (iii) and (iv) are set at the intersection points of the orthogonal lattices, but the points other than the intersection points can be selected as representative points and target points. The results obtained are similar to the first embodiment.

The fourth example: As FIG. 3B illustrates, in the first embodiment, the operating direction and the position of the leading end 21 of the slave 2 almost correspond to the operating direction and the position of the leading end 11 of the master 1 in most of the area of the working area B. However, in the strict sense, as FIG. 3B illustrates, the working range in a vertical direction of the working area B is larger than the working range in a lateral direction of the working area B; therefore, when operating in a slanting direction, the direction and the moving amount do not correspond to those of the master 1. In addition, as described in the first embodiment, in the vicinity of the closed line B1 of the working area B, the operating direction and the position of the master 1 do not correspond to those of the slave 2.

The above-described lack of correspondence is a disadvantage which inevitably occurs since the operating area A and working area B are not similar, and various kinds of modes can be prepared by utilizing the disadvantage. Specifically, in an example, the distribution of the plurality of target points in the above-described (ii) and (iv) in one area and one operating direction is inhomogeneously set to the distribution of the plurality of target points in the other area and direction of motion. In this example, a master/slave manipulator equipped with the operation locus fix of the slave 2 illustrated in FIGS. 4 and 5 can be provided.

Figure 4:
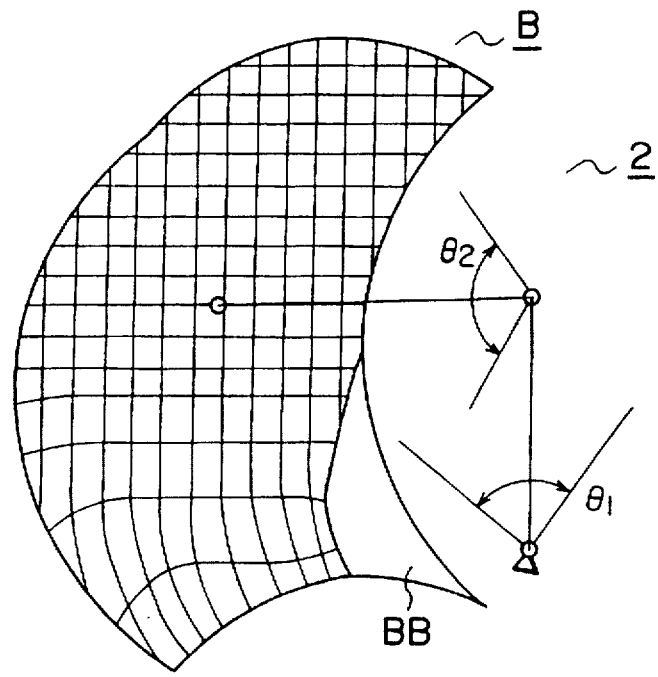
FIG. 4 is a diagram depicting the operation locus of the slave in an example based on the first embodiment.

FIG. 4 is a diagram of the operation locus of the slave 2 of which operation is designed to be completely similar to that of the master 1 in the area including the central and upper closed line illustrated in the drawing. In this case, the distortion appears on the lower part of the area and the closed line illustrated in the drawing, and on the above-described area and closed line, the operating direction and the position of the slave 2 do not correspond to those of the master 1.

Figure 5:
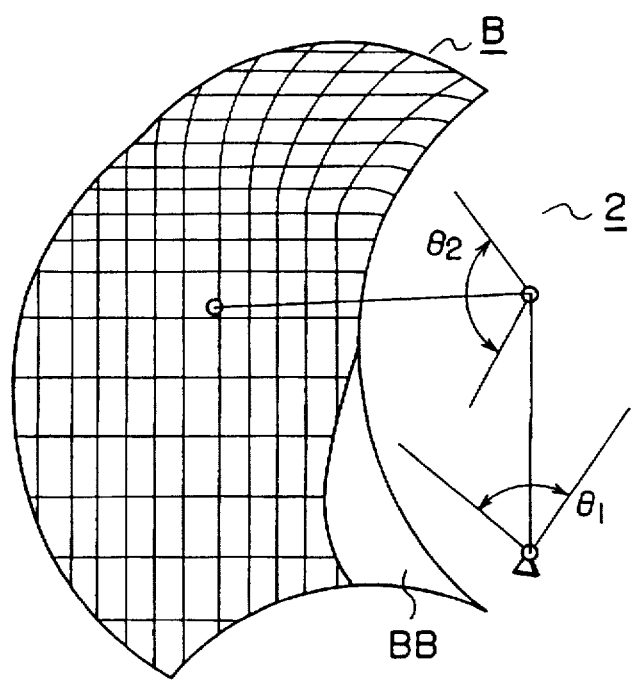
FIG. 5 is a diagram depicting the operation locus of the slave in another example aside from the example in FIG. 4.
Figure 6:
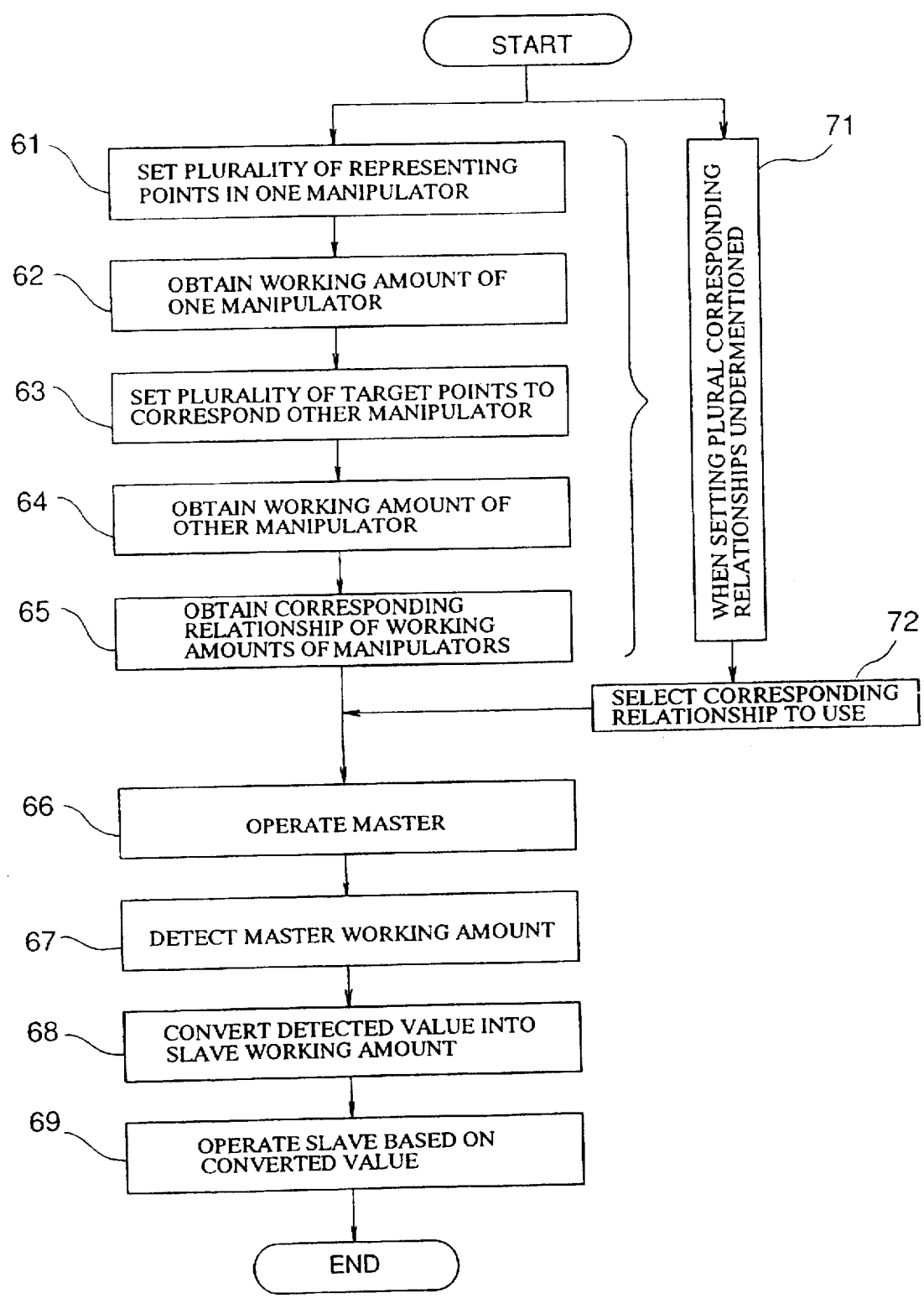
FIG. 6 is a flowchart of an example of a method for controlling a master/slave manipulator relating to the first embodiment of the present invention.

FIG. 5 is a diagram of the operation locus of the slave 2 of which operating direction is designed to correspond to that of the master 1 with a constant ratio being maintained in a lateral direction and a vertical direction of the slave 2 in the area including central and upper closed line illustrated in the drawing. In order to maintain the above-described constant ratio, the moving amount in a vertical direction is made to be larger than the moving amount in a lateral direction. In this case, the distortion appears on the upper area and the operating direction illustrated in the drawing, and on the area and the closed line, the operating direction and the position of the slave 2 do not correspond to those of the master 1.

As in the above, in the working area B, an area and operating direction with necessary meaning being added according to a purpose can be realized. Incidentally, the meaning means effectiveness, for example, in the case of using frequency being high, or in the case of operation with high precision being required.

Further, by preparing a plurality of corresponding relationships based on the areas and operating directions with different meanings inside the working area B, an operator can selectively use a corresponding relationship used in the control means 3 by the selection command sending means 6 (refer to FIG. 1).

Then, a second embodiment according to the present invention will be particularly described with reference to the attached drawings.

Figure 9:
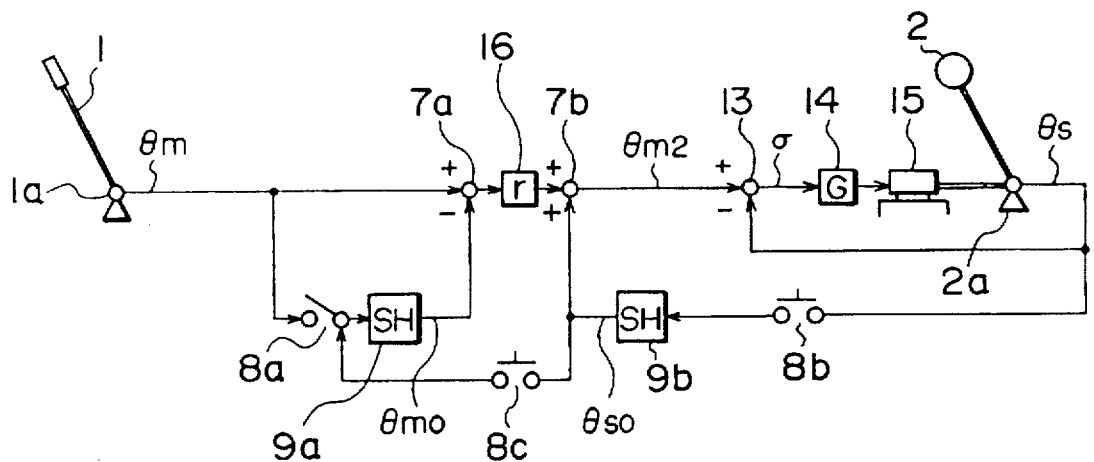
FIG. 9 is an explanatory diagram of a command transfer system relating to the second embodiment.

In FIG. 9, in the command transfer system of the second embodiment, a first comparator 7a, an enlargement ratio multiplier 16, and an adder 7b are interposed in the portion from the master 1 to a second comparator 13 in the order described. A circuit branching from the master 1 and connecting to the first comparator 7a is provided, and in this circuit, a first switch 8a and a first sample-and-hold device 9a (hereinafter, referred to as a first hold device 9a) are connected in series in the order described. Further, a circuit branching from the slave 2 and connecting to the adder 7b is provided, and in this circuit, a second switch 8b and a second hold device 9b are connected in series in the order described. In addition, a circuit branching from the second hold device 9b and connecting to the first switch 8a and the first hold device 9a is provided, and in this circuit, a third switch 8c is interposed to configure the command transfer system. Specifically, the command transfer system is controlled so that attitude information θs corresponds to altered attitude information θm2 outputted from the adder 7b. The following equation (8) expresses the above.

$$\theta s \rightarrow \theta m2 \quad (8)$$

The altered attitude information θm2 is shown by the following equation (9) as understood from the first comparator 7a, the enlargement ratio multiplier 16 and the adder 7 in FIG. 9.

$$\theta m2 = (\theta m - \theta mo) \times r + \theta so \qquad (9)$$

θmo in the equation (9) is reference attitude information memorized in the first hold device 9a, while θso is reference attitude information memorized in the second hold device 9b. Both are renewed by closing the first switch 8a and the second switch 8b, and become a fixed value by opening the first switch 8a and the second switch 8b.

FIG. 9 shows a normal operating condition of both manipulators, and all the switches 8a, 8b, and 8c are open. Accordingly, the reference attitude information θmo and the reference attitude information θso in the equation (9) have fixed values, that is, the attitude information θm and the attitude information θs (former values) inputted in both sample-and-hold devices 9a and 9b immediately before the first switch 8a and the second switch 8b are opened.

Figure 11:
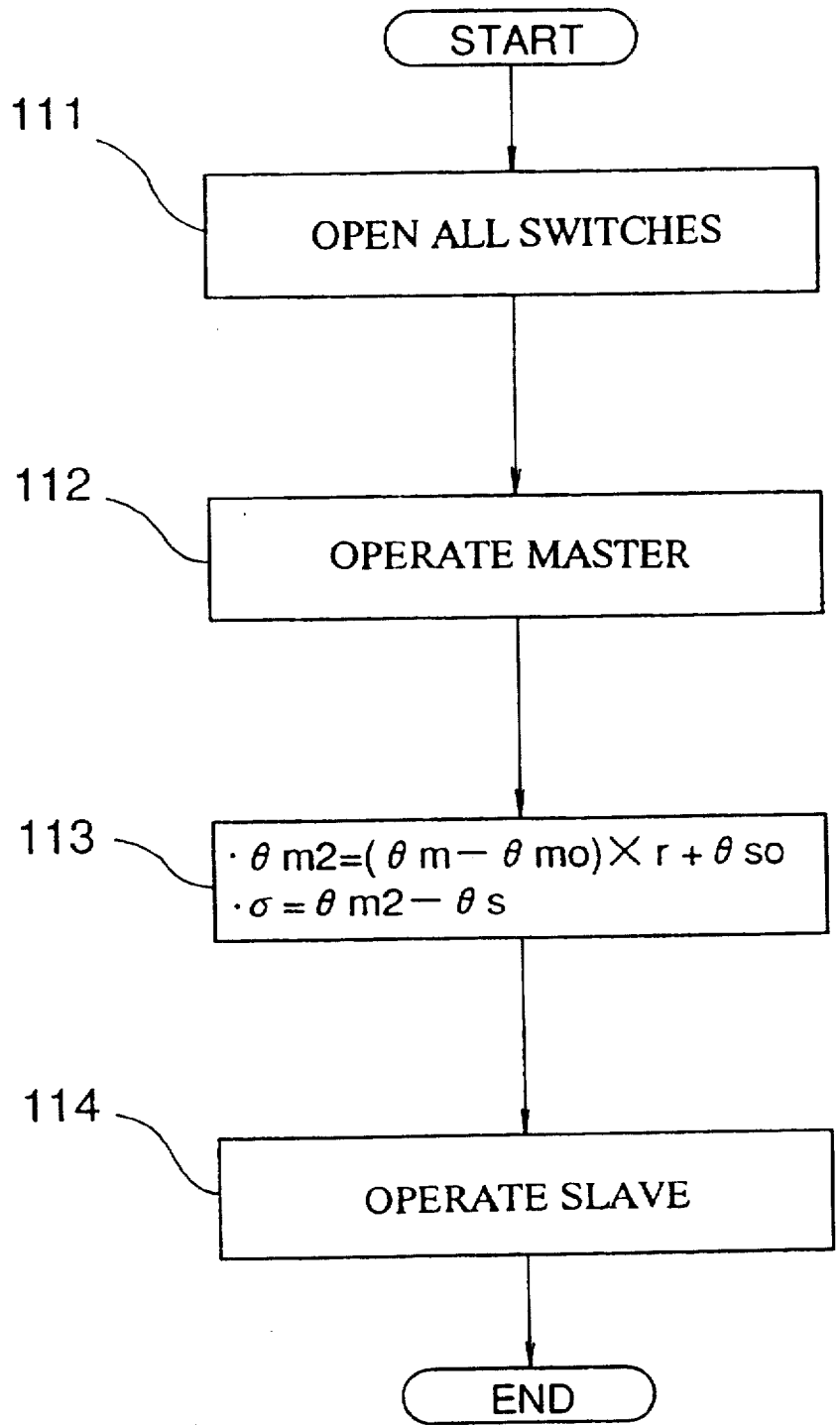
FIG. 11 is a flowchart at the time of a normal operation relating to the second embodiment.

The above-described normal operating condition will be explained with reference to a flow chart in FIG. 11. Initially, as described in the above, all the switches 8a, 8b, and 8c are open (Step 111). Then, the master 1 is operated (Step 112). By operating the master 1, the present attitude angle θm of the master 1 from an angle detector 1a, and the above-described reference attitude information θmo from the first hold device 9a are inputted in the first comparator 7a. The first comparator 7a calculates the deviation (θm−θmo). Then the enlargement ratio multiplier 16 multiplies this result by an enlargement ratio r |(θm−θmo)×r|, and the result is inputted to the adder 7b. In this adder 7b, the above-described reference attitude information θso is inputted from the second hold device 9b. Then, the addition is conducted |(θm−θmo)×r+θso|, and as a result, θm2 is inputted in the second comparator 13. In the second comparator 13, the present attitude information θs is inputted from the angle detector 2a. Therefore the second comparator 13 compares θm2 and θs, and obtains a deviation σ(=θm2−θs) (Step 113). A gain G is applied to this deviation σ in a gain multiplier 14, then the result is inputted in an actuator 15, and the slave 2 is driven in a direction which makes the deviation a to be zero (Step 114). Thereby both manipulators are normally operated.

Figure 12:
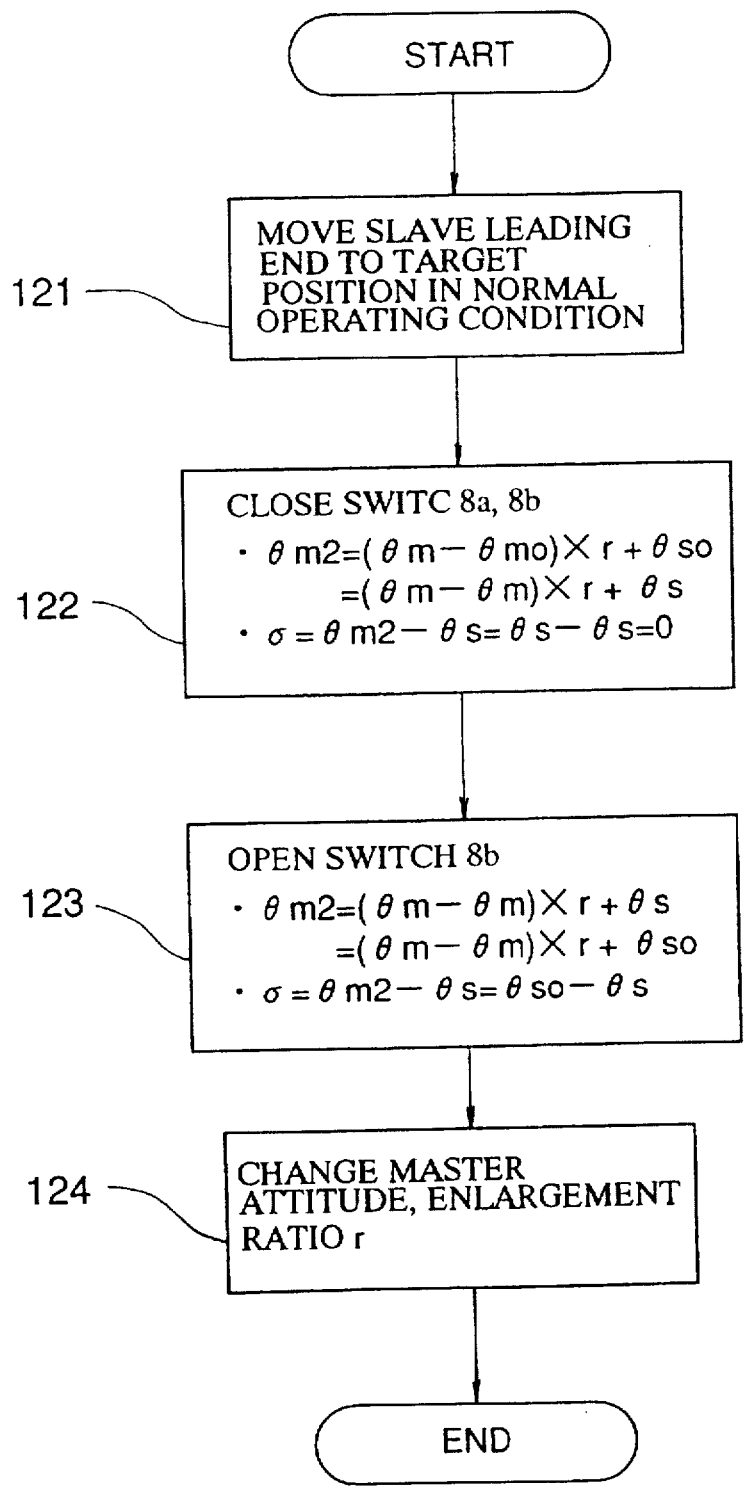
FIG. 12 is a flowchart at the time of a corresponding position shift and an enlargement ratio change relating to the second embodiment.

Then, the cases of corresponding position shift and enlargement ratio change will be explained with reference to a flowchart in FIG. 12. At first, in a normal operating condition in the above-described FIG. 9, the leading end of the slave 2 is moved to a target position by operating the master 1 (Step 121). After completion of the shift (namely, after being halted), the first switch 8a is closed without operating the master 1, and at the same time or thereafter, the second switch 8b is also closed. In this example, the first switch 8a and the second switch 8b are closed simultaneously (Step 122). When the first switch 8a is closed, the reference attitude information θmo (former value), memorized in the first hold device 9 until then, is renewed to be the attitude information θm presently inputted. Accordingly, the reference attitude information θmo is always equal to the attitude information θm (θmo=θm), so that the calculated deviation in the comparator 7a becomes zero. In other words, even when the leading end of the master 1 is shifted to a desired position (that is, in whatever attitude the master 1 may be), and to whatever value the enlargement ratio r in the enlargement ratio multiplier 16 may be changed, the output to the adder 7b is zero, therefore the attitude of the slave 2 is not changed. On the other hand, when the second switch 8b is closed, the reference attitude information θso (former value), memorized in the second hold device 9b until then, is renewed to be the attitude information θs presently inputted.

Therefore the second switch 8b is immediately opened (Step 123). It is also suitable that the second switch 8b is only closed instantly after the above-described first switch 8a is closed. When the second switch 8b is opened, the reference attitude information θso, memorized in the second hold device 9b, remains to be the attitude information θs of the leading end of the slave 2 in a target position until the second switch 8b is closed. Accordingly, the leading end of the slave 2 continues to maintain the attitude in the target position. The above is expressed in the equation (10).

$$\theta m2 = (\theta m - \theta mo) \times r + \theta so \qquad (10)$$
$$= (\theta m - \theta m) \times r + \theta so = \theta so$$

Specifically, "θm2=θso (a fixed value)". Then, the master 1 is made to be in a desired attitude (the leading end of the master 1 is made to be at a desired position), and/or the enlargement ratio r is changed to be a desired value (Step 124). During this time, the slave 2 remains at rest. Thereby the corresponding position shift and the enlargement ratio change are completed.

Incidentally, when a normal operation based on the above-described renewed corresponding position shift and enlargement ratio change is to be conducted, the first switch 8a is opened. Since the second switch 8b is already opened, the master/slave manipulator will be in a normally operating condition by opening the first switch 8a, so that a normal operation can be conducted based on the renewed corresponding position shift and enlargement ratio change.

Figure 13:
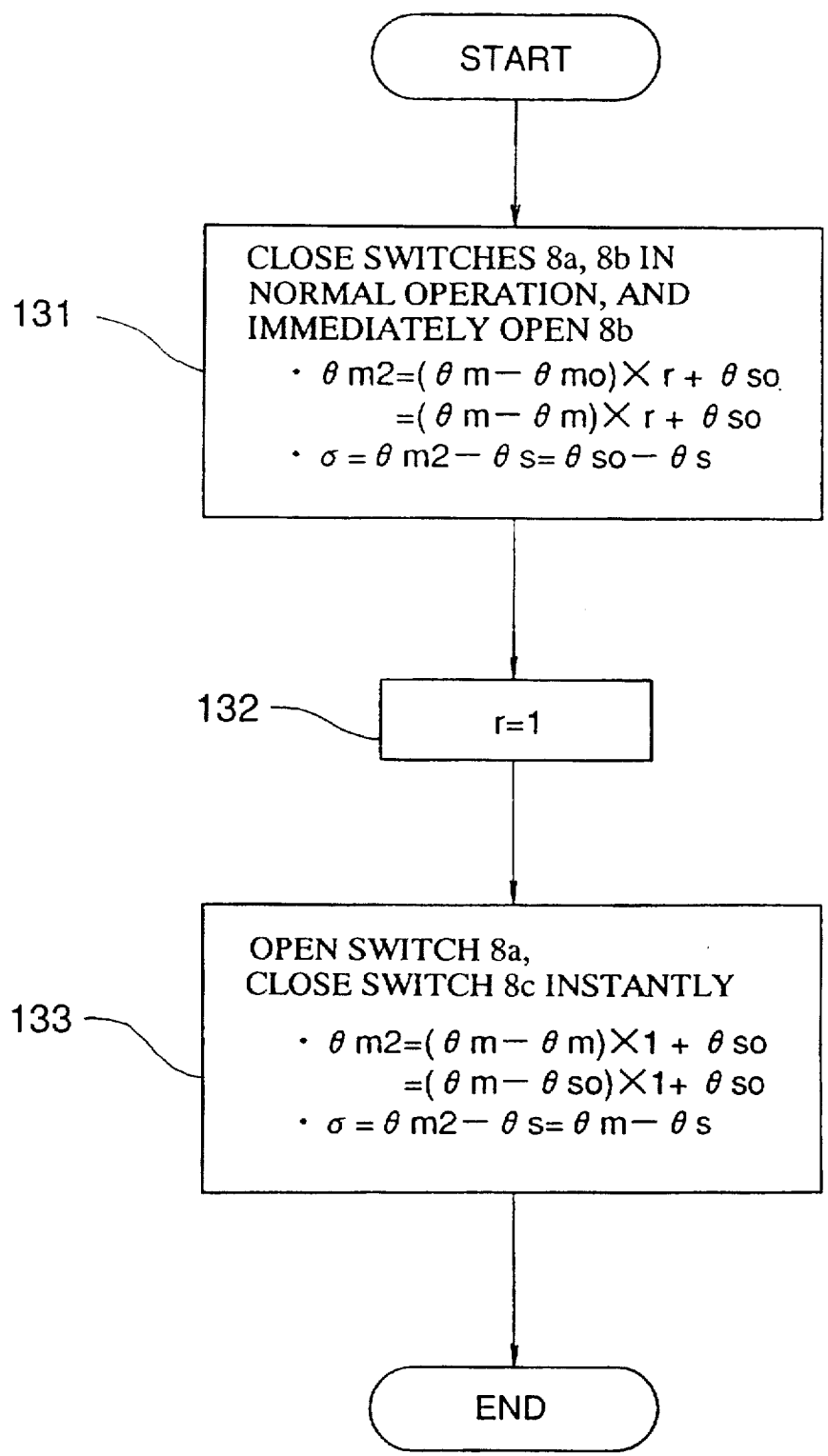
FIG. 13 is a flowchart at the time of returning to a fixed relationship of a corresponding attitude and enlargement ratio relating to the second embodiment.
Figure 14:
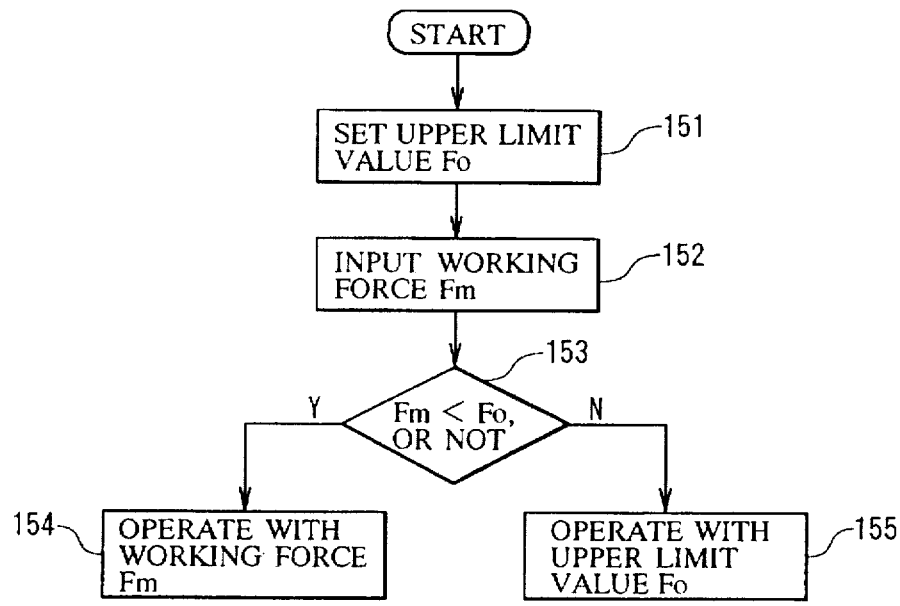
FIG. 14 is a flowchart for control relating to a third embodiment of the present embodiment.

The case in which a corresponding position and an enlargement ratio of the master 1 and slave 2 are returned to a fixed relationship of a position and enlargement ratio in FIG. 22 will be explained with reference to a flowchart in FIG. 13. First, in the above-described normal operating condition (the condition in which all the switches 8a, 8b, and 8c are open), the first switch 8a is closed, then at the same time or thereafter the second switch 8b is closed, and thereafter the second switch 8b is immediately opened (Step 131). Then, the reference attitude information θmo in the sample-and-hold device 9a and the reference attitude information θso in the sample-and-hold device 9b are renewed, and as described in the above, the output from the adder 7b becomes a fixed value θso |=(θm−θm)×r+θso|, therefore any operation of the master 1 or any value of the enlargement ratio r does not have an effect on the attitude of the slave 2.

For the next step, the enlargement ratio r is made to be "r=1" (Step 132). Then, after opening the first switch 8a, the third switch 8c is instantly closed (Step 133). Thereby, the reference attitude information θmo, memorized in the first hold device 9a, is renewed to be the reference attitude information θso, memorized in the second hold device 9b, without being affected by the attitude information θm from the master 1 (θmo=θso).

Accordingly, the altered attitude information θm2 of the above-described equation (10) is $$\theta m2 = (\theta m - \theta mo) \times r + \theta so$$
$$= (\theta m - \theta so) \times 1 + \theta so = \theta m$$

Figure 22:
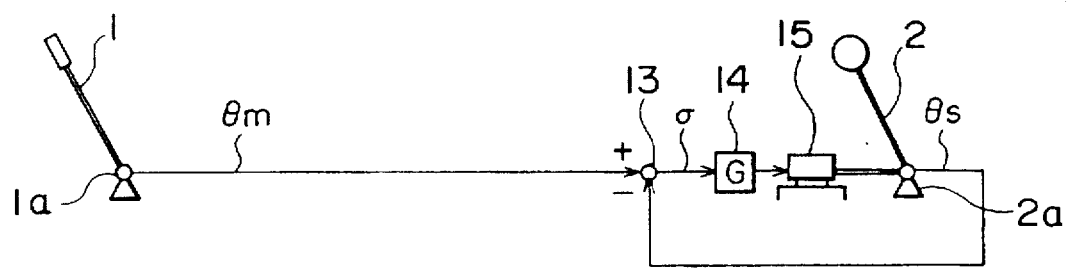
FIG. 22 is an explanatory diagram of a command transfer system of a fixed corresponding attitude and enlargement ratio relating to the conventional art.
Figure 23:
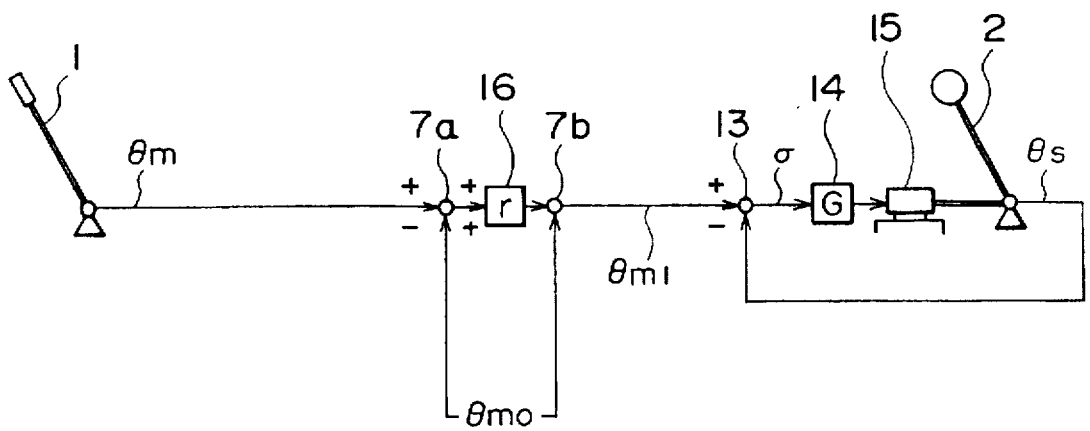
FIG. 23 is an explanatory diagram of a command transfer system of corresponding position shift and enlargement ratio change relating to the conventional art.
Figure 24A:
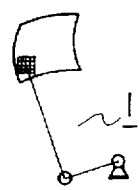
FIGS. 24A and 24B are diagrams depicting a condition of normal correspondence of the manipulators relating to the conventional art.
Figure 24B:
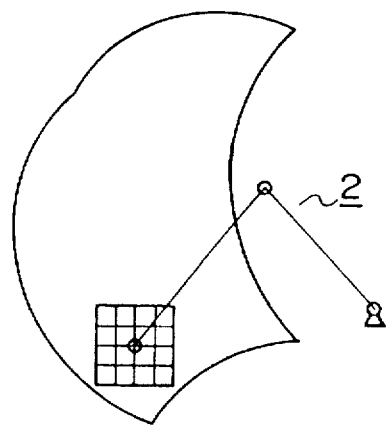
Figure 25A:
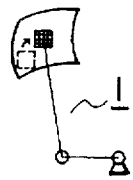
FIGS. 25A and 25B are diagrams at the time of shifting a corresponding position between the manipulators relating to the conventional art.
Figure 25B:
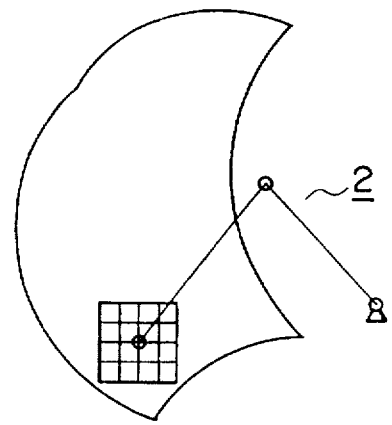
Figure 26A:
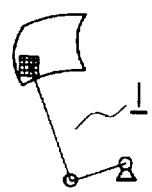
FIGS. 26A and 26B are diagrams at the time of changing an enlargement ratio between the manipulators relating to the conventional art.
Figure 26B:
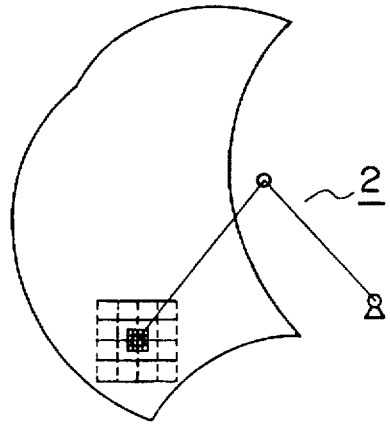
Figure 27:
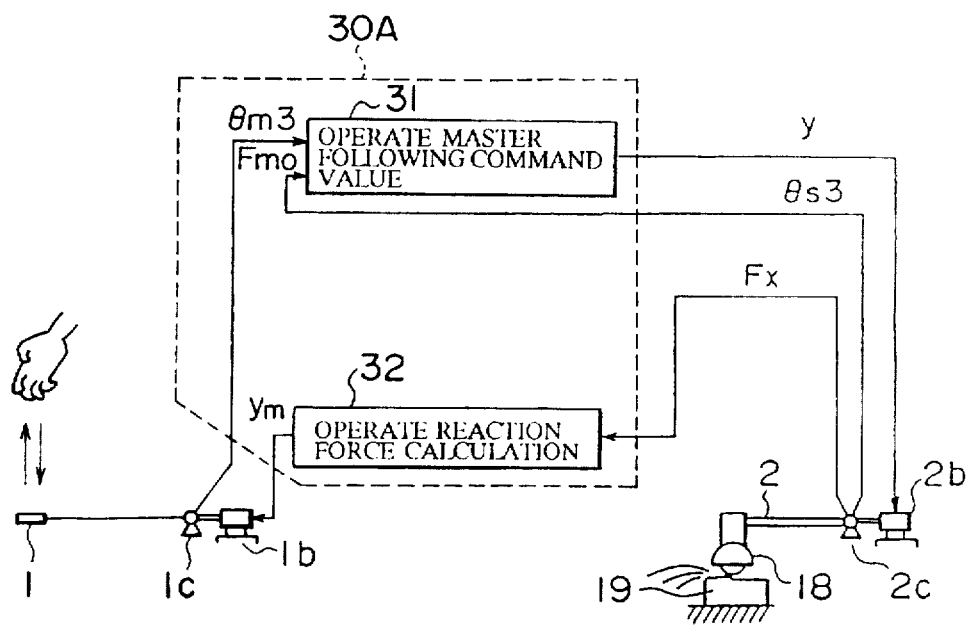
FIG. 27 is an explanatory diagram of a command transfer (system of a bilateral type of master/slave manipulator relating to the conventional art.

Specifically, "θm2=θm", and the relationship is the same as in FIG. 22.

Figure 10:
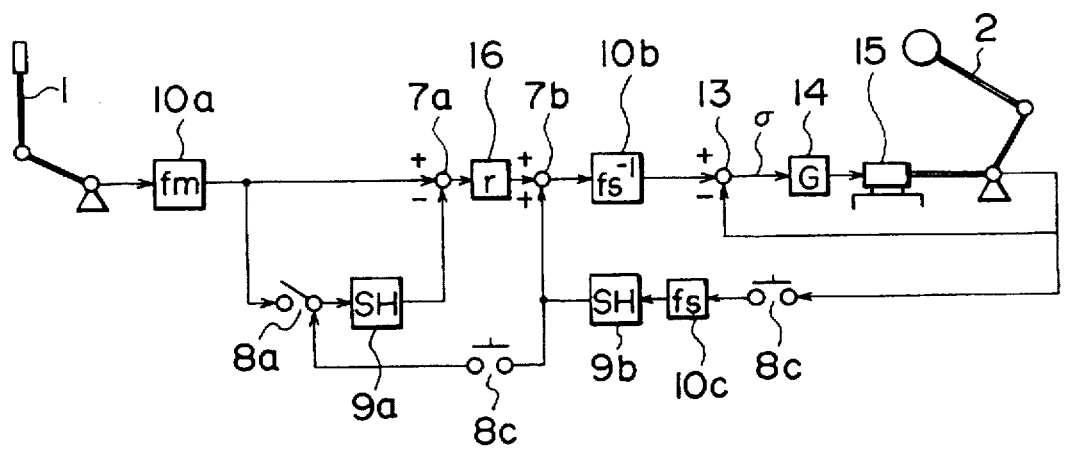
FIG. 10 is an explanatory diagram of an example of the command transfer system in FIG. 9 with a coordinate converter being interposed.

In the second embodiment, a case of a pair of operating axes is described in order to make the explanation easy; however, the master 1 and the slave 2 having a plurality of operating axes can be dealt with in the same way if the positional information is considered to be vector quantity. In the above-described embodiment, the corresponding position shift and the enlargement ratio change are carried out with the attitude information (the angles θm and θs), but when the position of the leading ends of the master 1 and slave 2 are to be dealt with by rectangular coordinates, coordinate converters 10a and 10c, and an inverse coordinate converter 10b are interposed, as illustrated in the command transfer system in FIG. 10.

As explained in the above, according to the second embodiment, the corresponding position shift and the enlargement ratio change of both manipulators can be conducted safely with the slave manipulator remaining at rest. In addition, when the adjustment is carried out about the other coordinate systems, the only thing to do is to interpose coordinate converters.

Next, the third embodiment relating to the present invention will be explained with reference to the drawings.

Figure 15:
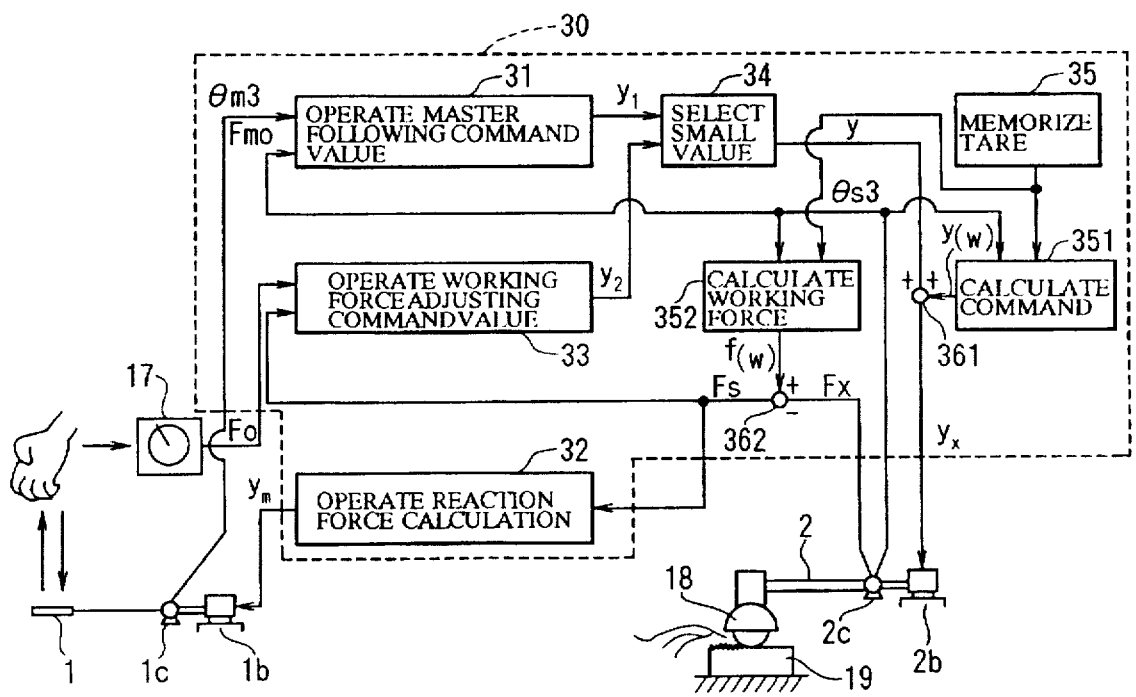
FIG. 15 is an explanatory diagram of a command transfer System relating to the third embodiment.

FIG. 15 is a diagram showing a command transfer system of the third embodiment. A control means 30 is a control device such as, for example, a microcomputer, and includes a master following command value operation section 31, a reaction force calculating operation section 32, a working force adjusting command value operation section 33, a small value selecting section 34, a slave tare memory section 35, a slave tare falling prevention command operation section 351, a slave tare falling amount working force calculating section 352, and the summing points 361 and 362. Further, the control means 30 is equipped with an upper limit value setting device 17 outside thereof in order to input an upper limit value Fo of the working force of the slave 2 for each kind of operation.

The master following command value operation section 31 inputs an attitude θm3 and an operating force Fmo of the master 1 from an attitude and force detector 1c; unputs an attitude θs3 from an attitude and force detector 2c; then calculates a command y1, corresponding to the above-described "working force Fm of the slave 2 estimated based on the operation of the master 1"; and outputs the command y1 to the small value selecting section 34. The working force adjusting command value operation section 33 inputs working force Fs, from the summing point 362, as well as the upper limit value Fo, inputted manually in the upper limit value setting device 17; calculates a command y2 to bring the working force Fs closer to the upper limit value Fo; and outputs the command y2 to the small value selecting section 34.

The reaction force calculating operation section 32 inputs the working force Fs from the summing point 362, generates a reaction force command value ym by applying a specified multiplier factor to the working force Fs, and then outputs the reaction force command value ym to an actuator 1b. The actuator 1b gives a reaction force, corresponding to the reaction force command value ym, to the master 1. In other words, the present embodiment is of a bilateral type. The small value selecting section 34 compares the above-described command y1 and the command y2, and the smaller one is outputted to the summing point 361 as a command y. The slave tare memory section 35 previously memorizes the tare of the slave 2 and an attachment, such as a grinder 18 or the like, and then outputs the tare to the slave tare falling prevention command operation section 351 and to the slave tare falling amount working force calculating section 352.

The slave tare falling prevention command operation section 351 inputs the memorized tare from the slave tare memory section 35 and the attitude θs3 of the slave 2 from the attitude and force detector 2c, and calculates a slave tare falling prevention command y(W) for each attitude θs3 of the slave 2, then outputs the slave tare falling prevention command y(W) to the summing point 361. The slave tare falling amount working force calculating section 352 inputs the memorized tare from the slave tare memory section 35, the attitude θs3 of the slave 2 from the attitude and force detector 2c, and a slave tare falling amount working force f(W) for each attitude θs3 of the slave 2, and then outputs the slave tare falling amount working force f(W) to the summing point 362.

The summing point 361 inputs the command y (the smaller one of y1 and y2), from the small value selecting section 34, and the slave tare falling prevention output command y(W), from the slave tare falling prevention command operation section 351; calculates a command yx $|=y+y(W)|$; and then outputs the command yx to an actuator 2b. The actuator 2b operates the slave 2 in accordance with the command yx. The summing point 362 inputs the slave tare falling amount working force f(W) from the slave tare falling amount working force calculating section 352, and a load Fx of the slave 2, from the attitude and force detector 2c; calculates the working force Fs $|=f(W)-Fx|$; and then outputs the working force Fs to the working force adjusting command value operation section 33 and the reaction force calculating operation section 32. The load Fx of the slave 2 is a load put on the slave 2 from the outside, by an external force and the gravity; therefore, the inverse value (−Fx) is a force the slave 2 exerts on the outside and the gravity. Accordingly, the working force Fs, which is a result of adding the tare falling amount working force f(W) to the load Fx, is an actual working force of the slave 2 against the outside.

Incidentally, the load Fx of the slave 2 includes a load by the tare of the slave 2 and the attachment, and the contributing amount depends on the attitude θs3 of the slave 2. Accordingly, if the difference from the tare falling amount working force f(W), similarly depending on the attitude θs3, is set as Fs and if this Fs is compared to the upper limit value Fo, the influence by a change in the attitude can be eliminated; therefore accurate control can be carried out. Specifically, the command y2, outputted by the working force adjusting command value operation section 33, is a command based on the upper limit value Fo of the actual working force Fs which does not include the tare of the slave 2 and the attachment.

Figure 16A:
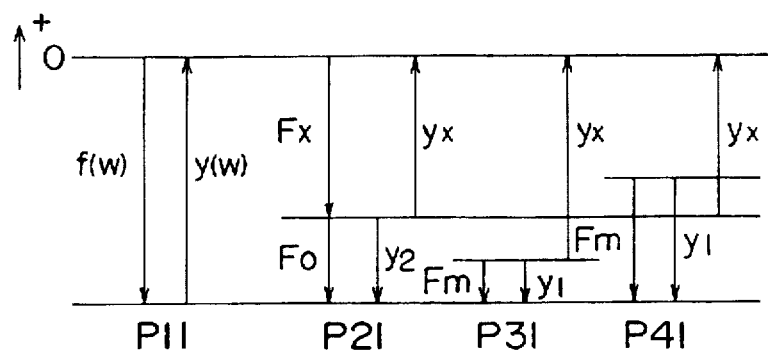
FIGS. 16A, 16B, and 16C are diagrams depicting relationships between a working force and a command relating to the third embodiment.
Figure 16B:
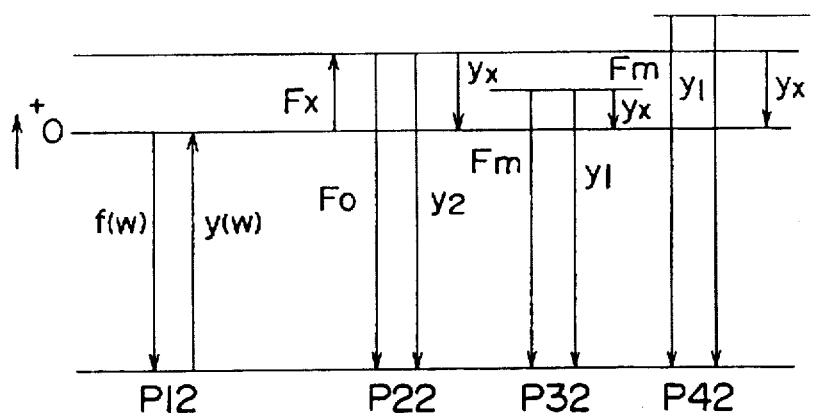
Figure 16C:
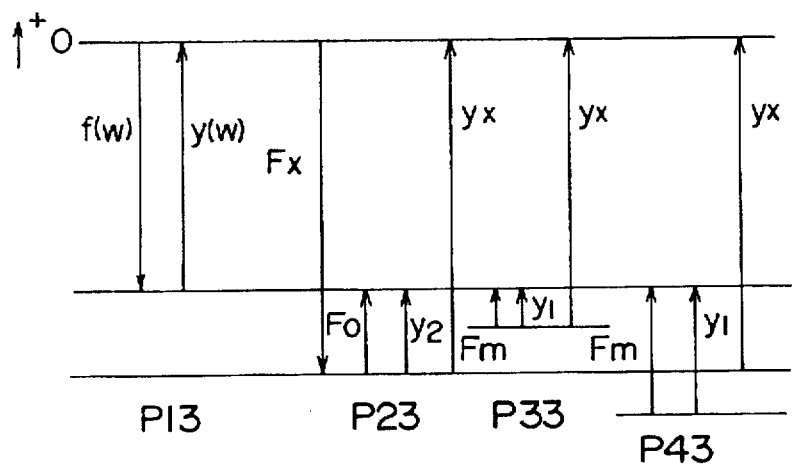

The operation of the small value selecting section 34 in the above-described structure will be described with reference to FIGS. 16A to 16C. Positions P11, P12, and P13 show a condition in which the working force of the slave 2, based on the command from the master 1, is zero.

Accordingly, "Fmo=Fm=0". In other words, the output command y1 of the master following command value operation section 31 is "y1=0". Since "y1<y2", the small value selecting section 34 selects the command y1 as the command y, and outputs the command y1 to the summing point 361.

The summing point 361 outputs to the actuator 2b the command yx $|=y+y(W)=0+y(W)=y(W)|$, in a word, "yx=y(W)." Here, the command y1 corresponds to the working force Fs; therefore "Fs=0". Accordingly, from the working force Fs (=f(W)−Fx), "Fx=f(W)". In other words, the command yx corresponds to the load Fx as illustrated in the drawings. Specifically, when Fm=0, the slave 2 is operated with the working force Fm (=0) (is halted in a space, or quietly moves in a space).

Positions P21, P22, and P23 show a condition in which the working force Fm, inputted from the master 1, coincides with the upper limit value Fo. Accordingly, "Fm=Fo". In this case, "y1≧y2"; therefore the small value selecting section 34 must select the command y2 as the command y. Then the summing point 361 outputs the command yx |=y2+y(W)| to the actuator 2b. The command y2 corresponds to Fo, therefore "Fs=Fo". That is, by selecting a small value when Fm=Fo, the slave 2 is operated with the working force Fo.

The positions P31, P32, and P33 show a condition in which the working force Fm, inputted from the master 1, is smaller than the upper limit value Fo. Accordingly, "Fm<Fo". In this case, "y1<y2"; therefore, the small value selecting section 34 must select the command y1 as the command y. Then the summing point 361 outputs the command yx |=y1+y(W)| to the actuator 2b. The command y1 corresponds to the working force Fm; therefore, "Fs=Fm". Specifically, when Fm<Fo, the slave 2 is operated with the working force Fm.

Positions P41, P42, and P43 show a condition in which the working force Fm, inputted from the master 1, is greater than the upper limit value Fo. Accordingly "Fm>Fo". In this case, "y1>y2"; therefore, the small value selecting section 34 must select the command y2 as the command y. Then the summing point 361 outputs the command yx |=y2+y(W)| to the actuator 2b. The command y2 corresponds to Fo; therefore, "Fs=Fo". Specifically, when Fm>Fo, the slave 2 is operated with the working force Fo. That is to say, in this case, however great the operation force Fm in the master 1 may be, the operation is made to be disabled, and the slave 2 is operated with maintaining the working force Fo (the upper limit value).

As described in the above, the control means 30 compares the working force Fm of the slave 2, estimated from the operation of the master 1, to the upper limit value Fo of the working force of the slave 2 previously set, and operates the slave 2 with the working force Fm when Fm<Fo, while operating the slave 2 with the working force Fo when Fm≧Fo.

In the above, the third embodiment is described in detail, and examples based on the embodiment will be explained.

The first example: In the third embodiment, downward operations in FIGS. 16A and 16B, and an upward operation in FIG. 16C are explained at the same time, and as is obvious from the drawings, the working forces Fs in both operations are in opposite directions to each other. In short, the working forces are different in signs of plus and minus. Accordingly, when it is to be made possible for a manipulator to carry out both of the above-described operations, further, for example, operations in right-and-left and back-and-forth directions (for example, the manipulator in FIG. 28 can operate in an up-and-down direction and in a right-and-left direction), and furthermore, operations in multiple directions as in the third embodiment, it can be dealt with, for example, by using one direction as the reference and changing the other directions to be the above-described reference direction with a sign converter.

The second example: The third example can be constituted by simply translating it into the following words (shall be essentially the same). Specifically, it can be a master/slave manipulator in which the slave 2 conducts a slave operation when the master 1 is operated; including the control means 30, which inputs the load Fxm |=f(w)–Fm| inputted from the master 1, which compares the load Fxm to the load upper limit value Fxo |=f(w)–Fo| previously set, and which brings the slave 2 into a slave operation with the load Fxm when Fxm>Fxo, while bringing the slave 2 into a slave operation with the load upper limit value Fxo when Fxm≦Fxo.

The third example: The third embodiment is of a bilateral type, but becomes a unilateral type when the actuator 1b and the-reaction force calculating operation section 32 are excluded. This is also suitable.

Figure 17:
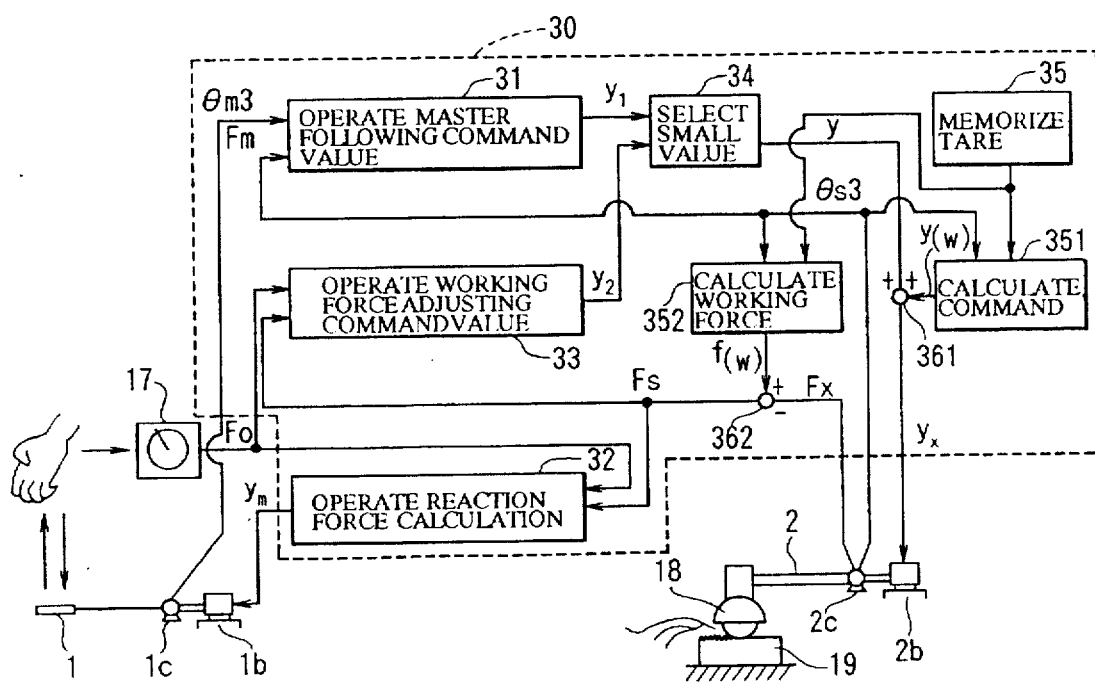
FIG. 17 is an explanatory diagram of a command transfer/ system of an example based on the third embodiment.

The fourth example: The third embodiment can be a bilateral type with a command transfer system in FIG. 17. Specifically, the upper limit value Fo, from the upper limit value setting device 17, is inputted to the reaction force calculating operation section 32; and when Fm<Fo, a force corresponding to the working force Fm is returned to the master 1, while when Fm≧Fo, a specified force Fc can be returned to the master 1. Incidentally, the specified force Fc can be in any form as long as the force is capable of informing an operator of the condition in which Fm≧Fo. For example, the force can be a rapid increase in a reaction force, vibrations, or a force corresponding to the working force Fo itself.

Figure 18:
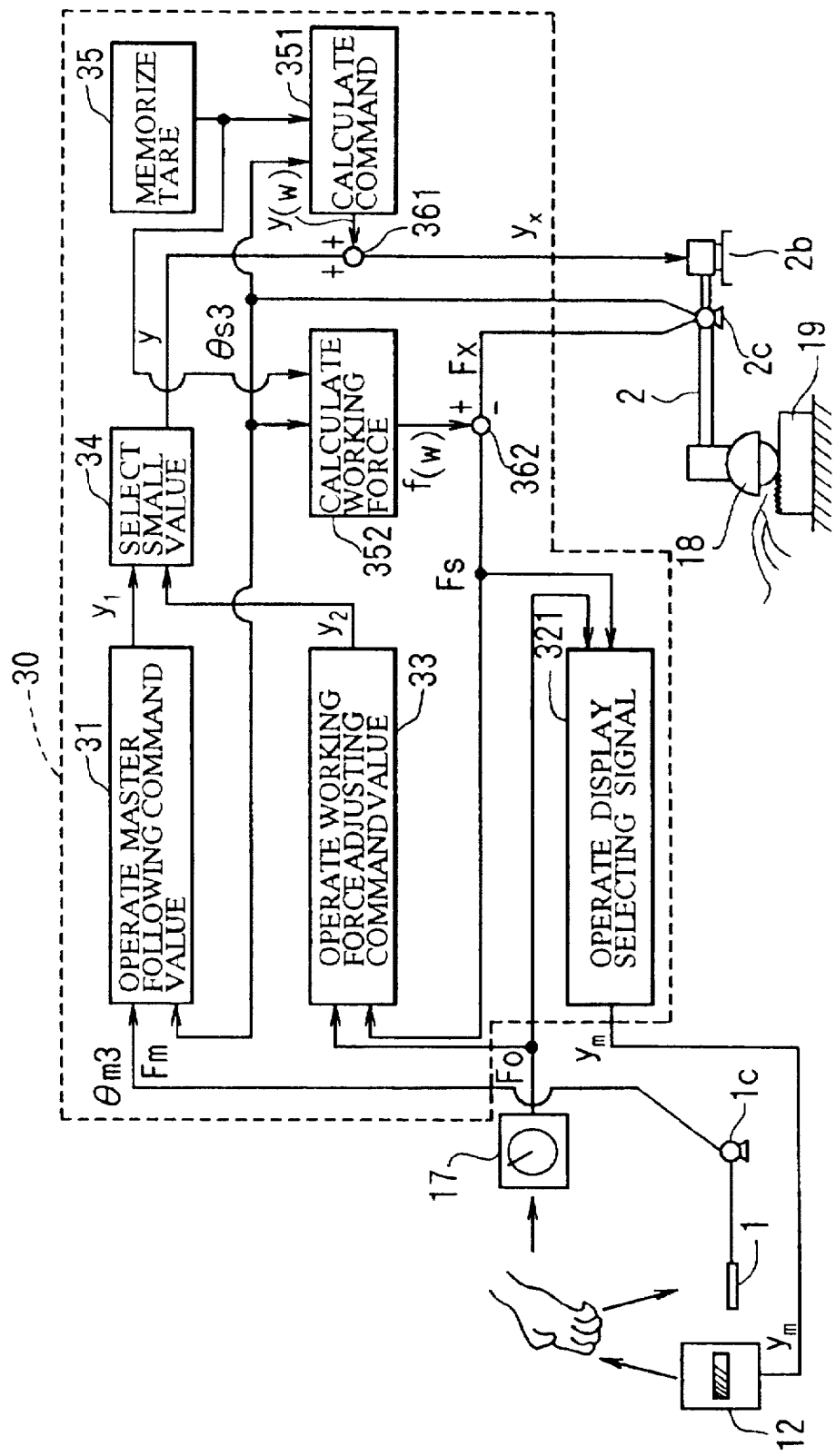
FIG. 18 is an explanatory diagram of a command transfer system of another example based on the third embodiment.
Figure 19A:
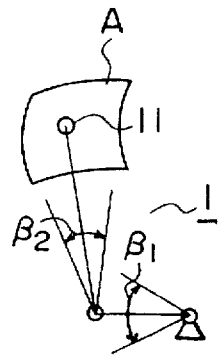
FIGS. 19A, 19B, and 19C are explanatory diagrams explaining a master/slave manipulator in a non-similar structure relating to the conventional art.
Figure 19B:
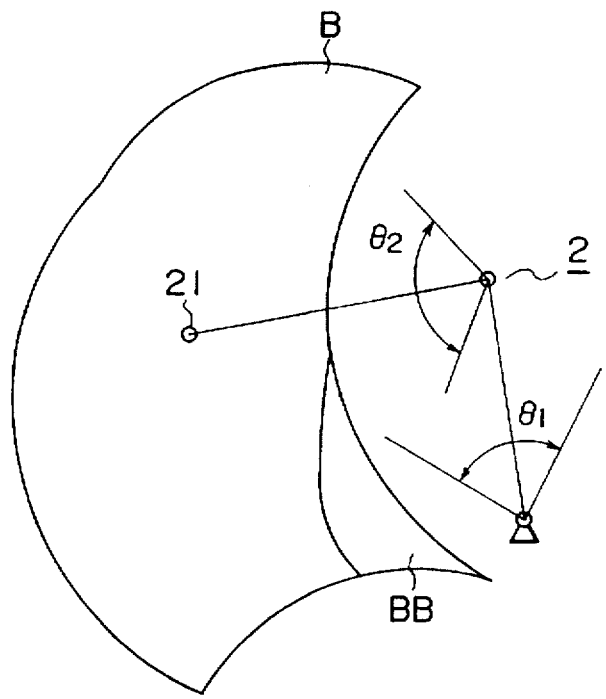
Figure 19C:
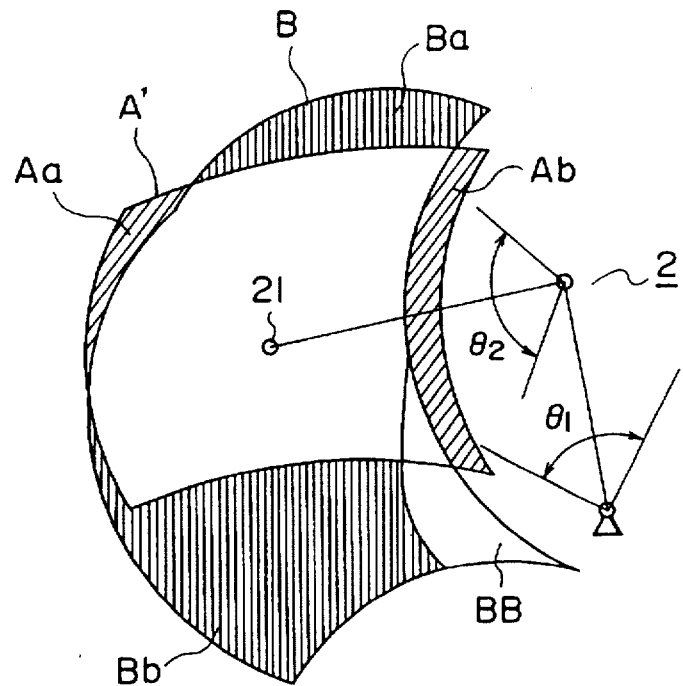

The fifth example: A command transfer system in FIG. 18 is suitable. Specifically, the actuator 1b and the reaction force calculating operation section 32 are excluded from the above-described third embodiment to make a unilateral type. By providing a display selection signal operation section 321 instead of the reaction force calculating operation section 32, and by connecting the output of the display selection signal operation section 321 to a warning device 12 such as, for example, an indicator and/or an alarm, an operator can be given an indication and/or an alarm of the condition in which Fs≧Fo. Thereby, even with a unilateral type, an operator can perceive the condition in which Fs≧Fo. It goes without saying that the warning device 12 can be used in a bilateral type.

The sixth example: In the third embodiment, the master/slave manipulator with one axis is described, but the embodiment is similarly applicable to the manipulator with a multiple of axes such as two axes, three axes and so on. Instead of inputting the attitudes θs3 and θm3, as in the above-described first embodiment, the position coordinates of the leading ends of both manipulators and each axis portion can be inputted. In this case, it is suitable to interpose a coordinate converter and an inverse coordinates converter in each of the above-described command transfer systems.

Figure 28:
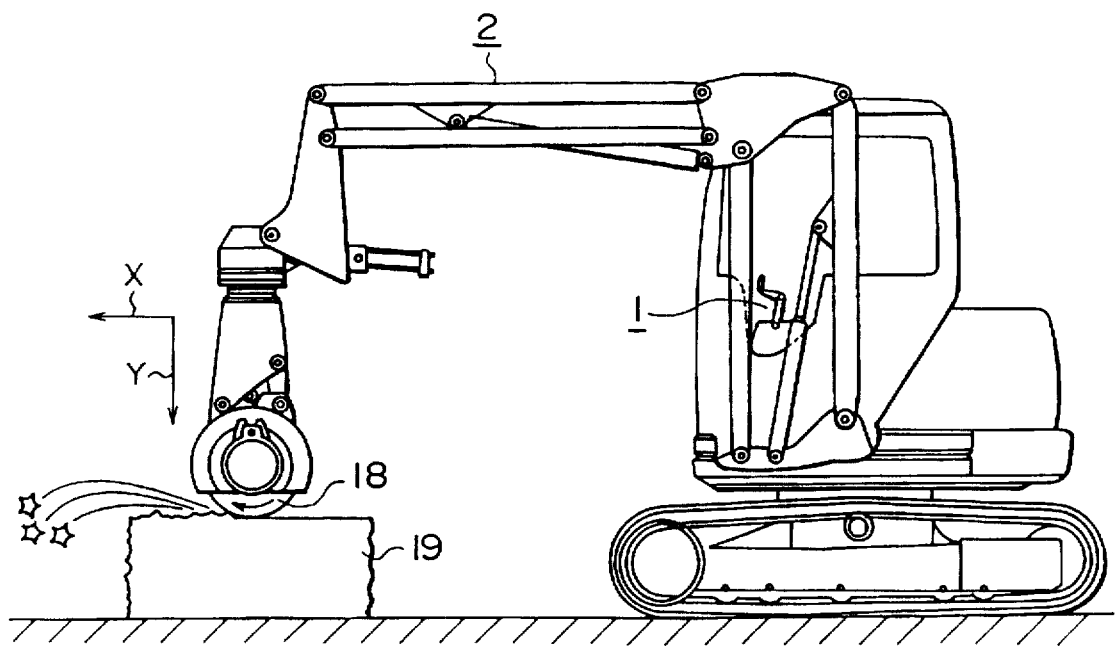
FIG. 28 is a side view of a wheeled rotary type of master/slave manipulator relating to the conventional art.

The seventh example: In the third embodiment, the master/slave manipulator operated in one dimension is described in order to make the explanation easy, but in a manipulator capable of operating in two dimensions or more, for example, as in FIG. 28, the following structure is possible. In FIG. 28, such a structure is possible as lets an excessive working force (Fm–Fo) in a Y direction escape in an X direction, if the working force Fs in the Y direction illustrated in the drawing reaches the upper limit value Fo based on the third embodiment while other working force Fs in the X direction illustrated in the drawing does not reach the upper limit value Fo and if even then the master 1 is further pressed in the Y direction. Thereby an operation moving in the X direction can be carried out effectively while controlling the working force in the Y direction.

According to the above-described third embodiment and the application examples, the working force of the slave does not exceed the upper limit value and can maintain the upper limit value, irrespective of the operating force of the master by an operator, be it a unilateral type of, or a bilateral type of master/slave manipulator. Therefore, working forces can be controlled preferably and automatically in an operation requiring the upper limit value for a working force such as a pulling force, pressing force, holding force, or the like.

By additionally providing the warning means 12, the control means 30 can give an operator a warning of the condition in which Fs≧Fo, and if this warning means 12 is additionally provided in, for example, a unilateral type of manipulator, the manipulator can be operated while keeping track of the upper limit of the working force similarly to a bilateral type of manipulator.

INDUSTRIAL AVAILABILITY

The present invention is useful as a master/slave manipulator and a method for controlling the same, in which a common working area of the master and the slave is large so that a sense of incongruity is not felt in operation, and in which a corresponding position shift and an enlargement ratio change of the master and slave can be achieved, and further a working force can be controlled.

We claim:

1. A method for controlling master/slave manipulators in which an operating area of a leading end of a master manipulator and an operating area of a leading end of a slave manipulator are not similar to each other, said method comprising the steps of:
   (1) setting a plurality of representing points on a first closed surface which is a limit surface of an operating area of a first one of said master manipulator and said slave manipulator;
   (2) setting a plurality of target points, to respectively correspond to the plurality of representing points set in said step (1), on a second closed surface which is a limit surface of an operating area of a second one of said master manipulator and said slave manipulator;
   (3) setting a plurality of representing points inside the operating area of said first one;
   (4) setting a plurality of target points, to respectively correspond to the plurality of representing points set in said step (3), inside the operating area of said second one;
   (5) obtaining working amounts of respective degrees of freedom of said first one when the leading end of said first one reaches each of the respective plurality of representing points set in said steps (1) and (3), while obtaining working amounts of respective degrees of freedom of said second one when the leading end of said second one reaches the corresponding respective plurality of target points set in steps (2) and (4);
   (6) obtaining a corresponding relationship between a pair of working amounts of said first one, obtained in step (5), and a pair of working amounts of said second one, obtained in step (5); and
   (7) when said slave manipulator is to be operated by operating said master manipulator, converting working amounts of the master manipulator, at the time of operation of the master manipulator, into working amounts of said slave manipulator based on the corresponding relationship obtained in said step (6) to thereby operate said slave manipulator based on the working amounts of said slave manipulator.

2. A method in accordance with claim 1, wherein in at least one of steps (2) and (4) the plurality of target points is set with an inhomogeneous distribution.

3. A method in accordance with claim 2, wherein a plurality of target points inhomogeneously set includes a number of pairs, and wherein step (6) includes obtaining a corresponding relationship of each of said number of pairs, and said method further comprises selecting from the corresponding relationships of said number of pairs a corresponding relationship to be used when said slave manipulator is to be operated by operating said master manipulator.

4. A method for controlling master/slave manipulators in which a corresponding position shift of a master manipulator and a slave manipulator can be freely achieved, and in which a slave operation by said slave manipulator following said master manipulator is attained by comparing in a comparator an operation signal from said master manipulator and an operation signal from said slave manipulator, said method comprising the steps of:
   at a time during which a corresponding position shift is to be effected, moving a leading end of said slave manipulator to a target position by operating said master manipulator;
   thereafter cutting off the operation signal to said comparator from said master manipulator while inputting to said comparator the operation signal of said slave manipulator, at a time of a cutoff of the operation signal from the master manipulator, instead of the operation signal from said master manipulator; and
   during a time of inputting to said comparator the operation signal from said slave manipulator instead of the operation signal from said master manipulator, shifting a leading end of said master manipulator to a desired position.

5. A method in accordance with claim 4, further comprising, during said time of inputting to said comparator the operation signal from said slave manipulator instead of the operation signal from said master manipulator, changing an enlargement ratio between the master manipulator and the slave manipulator.

6. A method for controlling master/slave manipulators in which an enlargement ratio between a master manipulator and a slave manipulator can be freely changed, and in which a slave operation by said slave manipulator following said master manipulator is attained by comparing in a comparator an operation signal from said master manipulator and an operation signal from said slave manipulator, said method comprising the steps of:
   at a time during which an enlargement ratio change is to be effected, halting the operation of the master manipulator;
   cutting off the operation signal to said comparator from said master manipulator while inputting to said comparator the operation signal of said slave manipulator, at a time of a cutoff of the operation signal from the master manipulator, instead of the operation signal from said master manipulator; and
   during a time of inputting to said comparator the operation signal from said slave manipulator instead of the operation signal from said master manipulator, changing the enlargement ratio between the master manipulator and the slave manipulator.

7. Apparatus comprising:
   a master manipulator having a leading end;
   a slave manipulator having a leading end, wherein an operating area of the leading end of the master manipulator, based on a working amount β of the master manipulator, and a working area of the leading end of the slave manipulator, based on a working amount θ of the slave manipulator, are not similar to each other;
   a control means including a memory; wherein said memory contains corresponding relationships between working amounts of respective degrees of freedom of a first one of said master manipulator and said slave manipulator and working amounts of respective degrees of freedom of a second one of said master manipulator and said slave manipulator; wherein the working amounts of said first one are represented by a first plurality of representing points on a first closed surface which is a limit surface of an operating area of said first one and a second plurality of representing points inside the operating area of said first one; wherein the working amounts of said second one are represented by a first plurality of target points, which respectively correspond to said first plurality of representing points, on a second surface which is a limit surface of an operating area of said second one, and a second plurality of target points, which respectively correspond to said second plurality of representing points, inside the operating area of said second one; wherein the working amounts of said first one are those when the leading end of said first one reaches each of the respective representing points in said first and second pluralities of representing points; and wherein the working amounts of said second one are those when the leading end of said second one reaches the corresponding respective target point in said first and second pluralities of target points;

a master working amount detecting means for detecting said working amount $\beta$ and for inputting to said control means a signal representing the thus detected working amount $\beta$; and a slave operating means for receiving from said control means a signal representing the working amount $\theta$ of said slave manipulator and for operating said slave manipulator based on the thus received signal representing said working amount $\theta$;

wherein, at the time of operating said master manipulator, said control means converts the working amount $\beta$ obtained from said master working amount detecting means into said working amount $\theta$, based on the corresponding relationships in said memory, and outputs to said slave operating means said signal representing said working amount $\theta$.

8. Apparatus in accordance with claim 7, wherein the corresponding relationships in said memory are corresponding relationships based on an inhomogenous distribution of target points.

9. Apparatus in accordance with claim 7, further comprising a selection command sending means; wherein said memory contains a number of corresponding relationships for different degrees of inhomogenous distribution; and wherein said control means selects a desired corresponding relationship from said number of corresponding relationships, based on a command from said selection command sending means.

10. Apparatus comprising:

a master manipulator for providing a master operation signal;

a slave manipulator for providing a slave operation signal;

a first comparator;

an enlargement ratio multiplier;

an adder;

a second comparator for comparing said master operation signal and said slave operation signal;

wherein said first comparator, said enlargement ratio multiplier, and said adder are interposed between said master manipulator and said second comparator in the named order beginning from the master manipulator;

a first open/close switch and a first sample-and-hold device, which are connected in series in a circuit which is in parallel to a circuit connecting said master manipulator to said first comparator, with the first open/close switch being between said master manipulator and said first sample-and-hold device; and a second open/close switch and a second sample-and-hold device, which are connected in series in a circuit which connects said slave manipulator and said adder, with said second open/close switch being between said slave manipulator and said adder.

11. Apparatus in accordance with claim 10, further comprising:

a third open/close switch which is connected between a connection of said second sample-and-hold device to said adder and a connection of said first open/close switch to said first sample-and-hold device.

* * * * *